United States Patent
Thangadorai et al.

(10) Patent No.: US 12,248,288 B2
(45) Date of Patent: Mar. 11, 2025

(54) METHOD AND SYSTEMS FOR ACHIEVING COLLABORATION BETWEEN RESOURCES OF IoT DEVICES

(71) Applicant: SAMSUNG ELECTRONICS CO., LTD., Suwon-si (KR)

(72) Inventors: Kavin Kumar Thangadorai, Karnataka (IN); Barath Raj Kandur Raja, Karnataka (IN); Srihari Sriram, Karnataka (IN); Kumar Murugesan, Karnataka (IN); Arjun Raj Kumar S, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 68 days.

(21) Appl. No.: 17/126,538

(22) Filed: Dec. 18, 2020

(65) Prior Publication Data
US 2021/0191351 A1    Jun. 24, 2021

(30) Foreign Application Priority Data

| Dec. 19, 2019 | (IN) | ............................ 201941052995 |
| Sep. 1, 2020 | (KR) | ...................... 10-2020-0111040 |
| Dec. 14, 2020 | (IN) | ............................ 2019 41052995 |

(51) Int. Cl.
*G16Y 10/80* (2020.01)
*G05B 19/042* (2006.01)
(Continued)

(52) U.S. Cl.
CPC ............ *G05B 19/042* (2013.01); *G16Y 10/75* (2020.01); *G16Y 10/80* (2020.01); *G16Y 40/10* (2020.01);
(Continued)

(58) Field of Classification Search
CPC .............. G06F 3/0482; G06F 3/04817; G06F 3/04842; G06F 3/04847; G06F 3/0488;
(Continued)

(56) References Cited

U.S. PATENT DOCUMENTS

| 9,189,252 B2 | 11/2015 | Chu et al. |
| 10,148,546 B2 | 12/2018 | Venkatraman et al. |

(Continued)

FOREIGN PATENT DOCUMENTS

| CN | 103475707 A | 12/2013 |
| CN | 104579755 A | 4/2015 |

(Continued)

OTHER PUBLICATIONS

Leonidis A, et al. "Ambient Intelligence in the Living Room". Sensors (Basel). Nov. 16, 2019;19(22):5011. doi: 10.3390/s19225011. PMID: 31744159; PMCID: PMC6891285.*

(Continued)

*Primary Examiner* — Jason D Recek
(74) *Attorney, Agent, or Firm* — Sughrue Mion, PLLC

(57) ABSTRACT

A method of controlling a plurality of Internet of Things (IoT) devices included in an IoT ecosystem is provided. A change of a value of a resource of an IoT device from among the plurality of IoT devices is detected, an intent associated with the resource of which the value is changed is identified, a resource associated with the identified intent from among resources of the plurality of IoT devices is determined, and a value of the determined resource is controlled based on a context corresponding to the identified intent.

10 Claims, 17 Drawing Sheets

(51) Int. Cl.
  *G16Y 10/75* (2020.01)
  *G16Y 40/10* (2020.01)
  *G16Y 40/30* (2020.01)
  *H04L 67/025* (2022.01)
  *G06F 3/04817* (2022.01)
  *G06F 3/0482* (2013.01)
  *G06F 3/04847* (2022.01)

(52) U.S. Cl.
  CPC ............ *G16Y 40/30* (2020.01); *H04L 67/025* (2013.01); *G05B 2219/2642* (2013.01); *G06F 3/04817* (2013.01); *G06F 3/0482* (2013.01); *G06F 3/04847* (2013.01)

(58) Field of Classification Search
  CPC ........ G16Y 10/75; G16Y 10/80; G16Y 40/10; G16Y 40/30; H04L 67/025
  See application file for complete search history.

(56) References Cited

U.S. PATENT DOCUMENTS

| | | | |
|---|---|---|---|
| 10,271,784 B2 | 4/2019 | Raymann et al. | |
| 10,345,769 B2 | 7/2019 | Zhang | |
| 11,264,031 B2 | 3/2022 | Jaygarl et al. | |
| 2015/0281002 A1 | 10/2015 | Xu et al. | |
| 2016/0063067 A1 | 3/2016 | Maitra et al. | |
| 2016/0099815 A1 | 4/2016 | Park et al. | |
| 2016/0105292 A1 | 4/2016 | Choi et al. | |
| 2016/0248847 A1 | 8/2016 | Saxena et al. | |
| 2016/0334772 A1 | 11/2016 | Nguyen et al. | |
| 2018/0122379 A1* | 5/2018 | Sohn | G10L 15/18 |
| 2019/0007232 A1 | 1/2019 | Kim et al. | |
| 2019/0044826 A1* | 2/2019 | Flores Guerra | H04W 4/08 |
| 2019/0243314 A1 | 8/2019 | Lyman et al. | |
| 2019/0245935 A1 | 8/2019 | Van Dusen | |
| 2020/0028703 A1* | 1/2020 | Homsi | H04L 12/2829 |
| 2020/0274934 A1* | 8/2020 | Smith | H04L 47/82 |
| 2020/0286477 A1 | 9/2020 | Jaygarl et al. | |

FOREIGN PATENT DOCUMENTS

| | | |
|---|---|---|
| KR | 10-2015-0086914 A | 7/2015 |
| KR | 10-2015-0120593 A | 10/2015 |
| KR | 10-1801952 B1 | 11/2017 |
| KR | 1020190031807 A | 3/2019 |
| KR | 1020190059419 A | 5/2019 |
| KR | 10-2020-0107058 A | 9/2020 |
| WO | 2018/084576 A1 | 5/2018 |
| WO | 2021/045278 A1 | 3/2021 |

OTHER PUBLICATIONS

Communication dated Jan. 11, 2022 issued by the Indian Patent Office in Indian Application No. 201941052995.

International Search Report and Written Opinion dated Apr. 5, 2021, issued by the International Searching Authority in International Application No. PCT/KR2020/018681(PCT/ISA/210 and 237).

Jin et al., "Resource Management Based on OCF for Device Self-Registration and Status Detection in IoT Networks," In: Intelligent and Cooperation Communication and Networking Technologies for IoT, Electrics 2019, vol. 8, Issue 3, doi: 10.3390/electronics8030311, Mar. 11, 2019, Total 23 pages.

Communication issued Nov. 14, 2024 by the Indian Intellectual Property Office in Indian Patent Application No. 201941052995.

Communication issued Dec. 3, 2024 by the Korean Intellectual Property Office in Korean Patent Application No. 10-2020-0111040.

* cited by examiner

METHOD AND SYSTEMS FOR ACHIEVING COLLABORATION BETWEEN RESOURCES OF IoT DEVICES

CROSS-REFERENCE TO RELATED APPLICATION(S)

This application is based on and claims priority under 35 U.S.C. § 119 to Indian Patent Application No. 201941052995 (provisional specification), filed on Dec. 19, 2019, and Indian Patent Application No. 201941052995 (complete specification), filed on Dec. 14, 2020, in the Indian Intellectual Property Office, and Korea Patent Application No. 10-2020-0111040, filed on Sep. 1, 2020, in the Korean Intellectual Property Office, the disclosures of which are incorporated by reference herein in their entireties.

BACKGROUND

1. Field

The disclosure relates to Internet of Things (IoT) devices, and more particularly, to methods and systems for achieving collaboration between resources of a plurality of IoT devices based on intent(s) associated with the resources.

2. Description of the Related Art

Currently, devices in an IoT ecosystem are configured to follow standards and guidelines provided by an Open Connectivity Foundation (OCF) architecture. The OCF architecture includes profiles (such as consumer, health, enterprise, individual, automobile, education and, so on) and services in an application layer of the OCF architecture. The OCF architecture may include a middleware framework, which may provide the means/rules for device discovery, provisioning the device(s), and communication between the device(s). The OCF architecture may include IoT data models and security models. The OCF architecture allows communication between the devices in the IoT ecosystem using communication protocols such as Zigbee, Z-wave, Wireless-Fidelity (Wi-Fi), and so on. The OCF architecture allows linking of applications and the IoT data models to the profiles. For example, 'smart home' may be linked with the profile 'consumer'.

Each device in the IoT ecosystem may include a plurality of resources. Each resource may have a Uniform Resource Identifier (URI), with corresponding properties and values. For example, a television as an example of an IoT device may have resources such as a color, a volume, a brightness, a contrast, a channel, and so on. A user may independently control each resource of the television and resources of other IoT devices in the IoT ecosystem. There may not be a relation between the resources of an IoT device or resources of the other IoT devices in the IoT ecosystem.

FIG. 1 illustrates an example of individually controlling the resources of IoT devices in an IoT ecosystem. Consider that a user receives a call on a mobile phone. The mobile phone may be considered as a part of the IoT ecosystem. The other IoT devices in the IoT ecosystem are a television, a fan (or range hood), a chimney (or kitchen chimney), and a dryer. Each of the IoT devices may have a plurality of associated resources with corresponding values. For example, the television may be associated with a resource 'volume'. The value of the volume may be either increased or decreased. The fan may be associated with a resource 'speed'. The value of the speed of the fan may be increased or decreased. The chimney may be associated with a resource 'level', which may be increased or decreased. The fan may be associated with a resource 'status', which may be either 'on' or 'off'.

When the user receives the call on the mobile phone, the television may be at a high volume, the fan may be turned on with a high speed, the level of the chimney may be operating at a high fan speed, and the dryer may be switched on. The television, the fan, the chimney, and the dryer may contribute to the ambient noise levels, which may disturb the user while the user is attending the call. In such circumstances, the user may need to reduce the television volume, reduce the speed (or level) of the fan, and reduce the fan speed of the chimney, and turn off the dryer. Changing each of the values of the resources of the television, the fan, the chimney, and the dryer quickly while attending the call may be highly cumbersome.

In another example, consider that the user desires to enable eco mode (or power saving mode) in an IoT device. The user may have difficulties in identifying all of IoT devices that provide support for the eco mode and individually applying the eco mode in each of the identified IoT devices.

In another example, consider that a threat (such as fire or security issues) is detected. Sensors that have detected the threat may send notifications indicating the threat to remote devices using IoT protocols. The notification may not be provided to other IoT devices in a smart home that may be vulnerable to the threat, if the other IoT devices have not been synchronized with the sensors.

In yet another example, if the user sets a rule in IoT devices that are within a smart home environment, the rules may not be intelligently added or adapted in IoT devices outside the smart home environment, such as office, vehicle, and so on.

FIG. 2 illustrates an example existing OCF architecture comprising two IoT devices. In the existing architecture, an OCF client device (labelled as OCF device 1), acting as a controller, may communicate with an OCF server device (labelled as OCF device 2). In this example, the OCF client device (OCF device1) may be a mobile phone and the OCF server device (OCF device2) may be a television (TV). The communication and/or interaction between the IoT devices (such as setting data or receiving data) may take place using corresponding OCF resources. For interaction between the resources of the OCF device 1 and the OCF device 2, the OCF architecture may perform Create, Retrieve, Update, Delete and Notify (CRUDN) operation. In an example, protocols such as Constrained Application Protocol (CoAP), Hypertext Transfer Protocol (HTTP), Extensible Messaging and Presence Protocol (XMPP) and so on, may be used for the interactions. The mobile phone (OCF device 1) may control the resources of the television (such as volume) and resources of other OCF devices such as chimney and fan separately.

SUMMARY

Provided are methods and systems for achieving collaboration between resources of a plurality of Internet of Things (IoT) devices in an IoT ecosystem based on intent(s) associated with the resource(s), wherein an IoT device in the IoT ecosystem is a controller IoT device.

Embodiments of the disclosure may associate the intents with at least one resource of at least one IoT device in the IoT ecosystem, and generate at least one group of resources of the IoT devices, wherein the resources of the IoT devices included in a group are associated with a common intent.

Embodiments of the disclosure may also monitor values of the resources of the IoT devices periodically, store the state of resources of the IoT devices in the master IoT device, detect changes in the values of the resources of the IoT devices, and accordingly, update the state of resources of the IoT devices in the master IoT device, wherein the state of the resources of the IoT devices comprises of the values of the resources.

Embodiments of the disclosure may also identify or derive the intents on detecting changes in the values of the resources of the IoT devices, wherein the changes may be affected by at least one of occurrence of an event in at least one IoT device, a user action on at least one IoT device, and the master IoT device.

Embodiment of the disclosure may also control resources of at least one IoT device based on a change in a value of a resource, associated with an intent, of an IoT device, wherein the resource undergoing the change and the controlled resources of the of at least one IoT device are grouped with the same intent.

Embodiments of the disclosure may also update intent-resource associations based on changes in the values of resources of the IoT devices, predefined intents associated with the resources of the IoT devices, and inputs from IoT sensors about impact of the changes in the IoT ecosystem.

According to an aspect of the disclosure, there is provided a method of controlling a plurality of IoT devices included in an Internet of Things (IoT) ecosystem, the method including: detecting a change of a value of a resource of an IoT device included in the plurality of IoT devices; identifying an intent associated with the resource of which the value is changed; determining a resource associated with the identified intent among resources of the plurality of IoT devices; and controlling a value of the determined resource based on a context corresponding to the identified intent.

The detecting may include detecting the change of the value of the resource of the IoT device based on at least one of an event that occurs in the IoT device, a user input for adjusting the value of the resource of the IoT device, or a control operation of an IoT device that controls other IoT devices in the IoT ecosystem.

The identified intent may indicate an aspect of an influence made to the IoT ecosystem according to the change of the value of the resource.

The method may further include: generating at least one group including resources associated with each of at least one intent among the resources of the plurality of IoT devices for each intent, wherein the identifying the intent includes: identifying an intent corresponding to a group including the resource of which the value is changed among the at least one group.

The context may include at least one of information on at least one resource of which a value is to be changed based on the intent being identified among the resources associated with the identified intent, information on a target value of the at least one resource, or information on an order in which the value of the at least one resource is to be changed.

The method may further include acquiring sensing data for at least one item related to the identified intent; and based on the sensing data being changed based on a change of a value of at least one resource not associated with the identified intent, determining that the at least one resource is associated with the identified intent.

The method may further include detecting a change of a value of a first resource among a plurality of resources associated with a first intent; detecting, based on the change of the value of the first resource, changes of values of remaining resources excluding the first resource among the plurality of resources; and determining that resources of which values are not changed based on the change of the value of the first resource among the remaining resources are not associated with the first intent.

The method may further include detecting a change of a value of a first resource associated with a first intent; detecting, based on the change of the value of the first resource, a change of a value of at least one second resource associated with a second intent different from the first intent; and determining that the at least one second resource of which the value is changed is associated with the first intent.

According to an aspect of the disclosure there is provided an IoT ecosystem comprising a plurality of Internet of Things (IoT) devices, wherein the plurality of IoT devices comprise: at least one IoT device; and an IoT device that controls the at least one IoT device, and wherein the IoT device is further configured to: detect a change of a value of a resource included in resources of the at least one IoT device; identify an intent associated with the resource of which the value is changed; determine a resource associated with the identified intent among resources of the plurality of IoT devices; and control a value of the determined resource based on a context corresponding to the identified intent.

The IoT device may be further configured to detect the change of the value of the resource based on at least one of an event that occurs in the at least one IoT device, a user input for adjusting the value of the resource of the at least one IoT device, or a control operation of the IoT device.

The identified intent may indicate an aspect of an influence made to the IoT ecosystem according to the change of the value of the resource.

The IoT device may be further configured to: generate at least one group including resources associated with each of at least one intent among the resources of the plurality of IoT devices for each intent, and identify the intent by identifying an intent corresponding to a group including the resource of which the value is changed among the at least one group.

The context may include at least one of information on at least one resource of which a value is to be changed based on the intent being identified among the resources associated with the identified intent, information on a target value of the at least one resource, or information on an order in which the value of the at least one resource is to be changed.

The IoT device may be further configured to: acquire sensing data for at least one item related to the identified intent, and based on the sensing data being changed based on a change of a value of at least one resource not associated with the identified intent, determine that the at least one resource is associated with the identified intent.

The IoT device may be further configured to: detect a change of a value of a first resource among a plurality of resources associated with a first intent; detect, based on the change of the value of the first resource, changes of values of remaining resources excluding the first resource among the plurality of resources; and determine that resources of which values are not changed based on the change of the value of the first resource are not associated with the first intent.

The IoT device may be further configured to: detect a change of the value of a first resource associated with a first intent; detect, based on the change of the value of the first resource, a change of a value of at least one second resource associated with a second intent different from the first intent;

and determine that the at least one second resource of which the value is changed is associated with the first intent.

According to an aspect of the disclosure, there is provided an IoT device for controlling a plurality of IoT devices, the IoT device and the plurality of IoT devices being included in an IoT ecosystem, the IoT device including: a communication interface configured to connect with the plurality of IoT devices; and a processor configured to: detect a change of a value of a resource of at least one IoT device included in the plurality of IoT devices; identify an intent associated with the resource of which the value is changed; determine a resource associated with the identified intent among resources of the plurality of IoT devices; and control a value of the determined resource based on a context corresponding to the identified intent.

The processor may be further configured to detect the change of the value of the resource of the at least one IoT device based on at least one of an event that occurs in the at least one IoT device, a user input for adjusting the value of the resource of the at least one IoT device, or a control operation of the IoT device.

The identified intent may indicate an aspect of an influence made to the IoT ecosystem according to the change of the value of the resource.

The processor may be further configured to: generate at least one group including resources associated with each of at least one intent among the resources of the plurality of IoT devices for each intent; and identify the intent by identifying an intent corresponding to a group including the resource of which the value is changed among the at least one group.

Accordingly, the embodiments provide methods and systems for achieving collaboration between resources of a plurality of Internet of Things (IoT) devices in an IoT ecosystem based on intent(s) associated with the resources. The IoT ecosystem includes a controller IoT device, which may control the resources of the other IoT devices. The embodiments include associating intents with resources of each of the IoT devices, wherein each resource of each IoT device may be associated with one or more intents and one intent may be associated one or more intents. Initially, the embodiments include associating predetermined intents with the resources of the IoT devices. The embodiments include creating groups of resources of a plurality of IoT devices based on association with a same intent. The embodiments include monitoring values of the resources of the IoT devices for detecting changes in the values of the resources. The changes may be detected by the controller IoT device using IoT sensors and when the IoT devices inform the controller IoT device. The embodiments include detecting the changes of the values of the resources due to occurrence of events in the IoT devices, user action on the IoT devices, and the controller IoT device. The embodiments include identifying the intents associated with the resources whose values have undergone changes. The embodiments include identifying resources of the IoT devices associated with the identified intent. The embodiments include controlling the values of the resources of the identified IoT devices associated with the identified intent based on a context. The embodiments include updating the associations of intents and resources based on changes in the values of the resources of the IoT devices, predefined intents associated with the resources of the IoT devices, and inputs from IoT sensors about impact of the changes in the IoT ecosystem.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
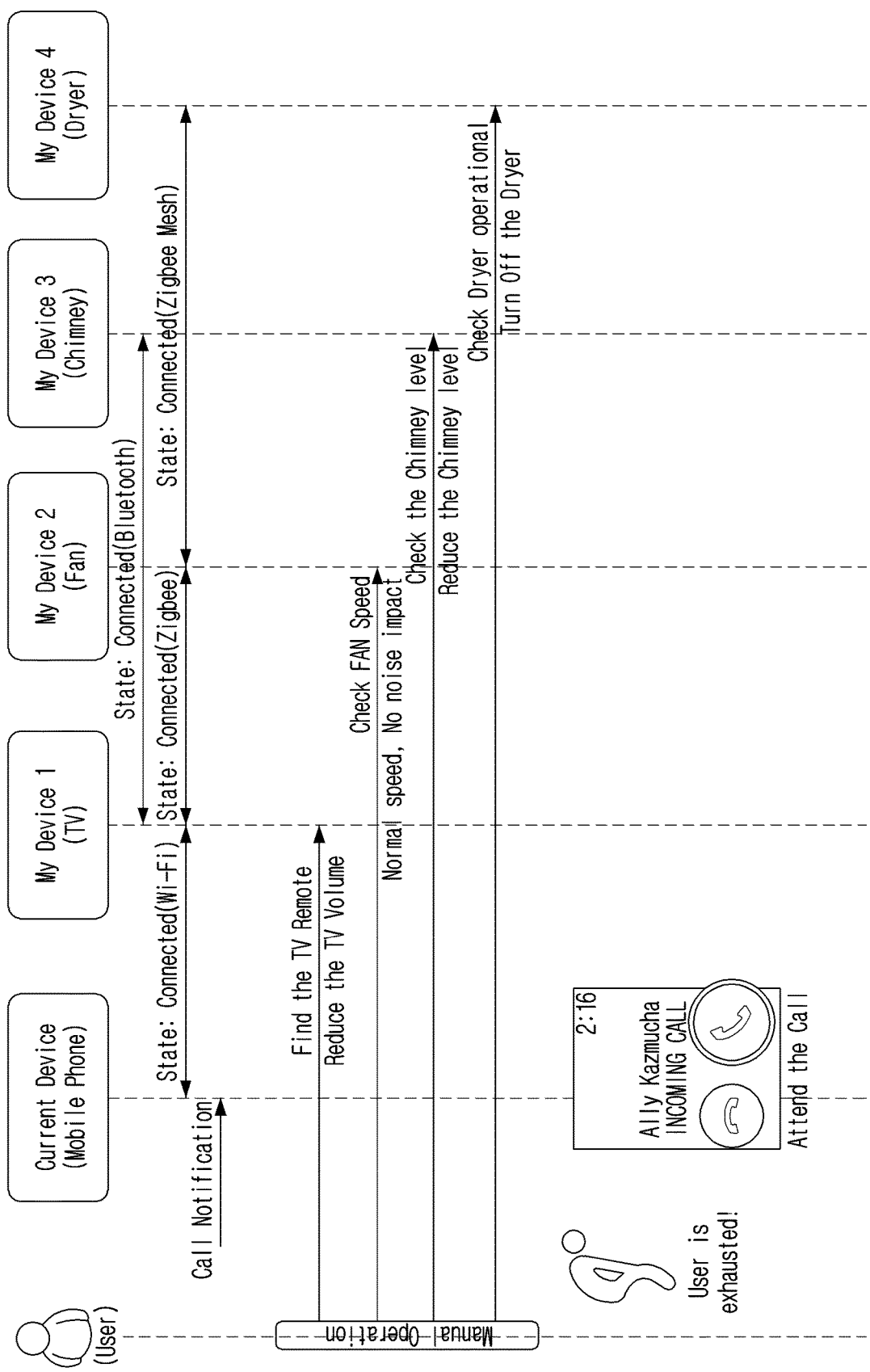
FIG. 1 illustrates an example of individually controlling resources of Internet of Things (IoT) devices in an IoT ecosystem.
Figure 2:
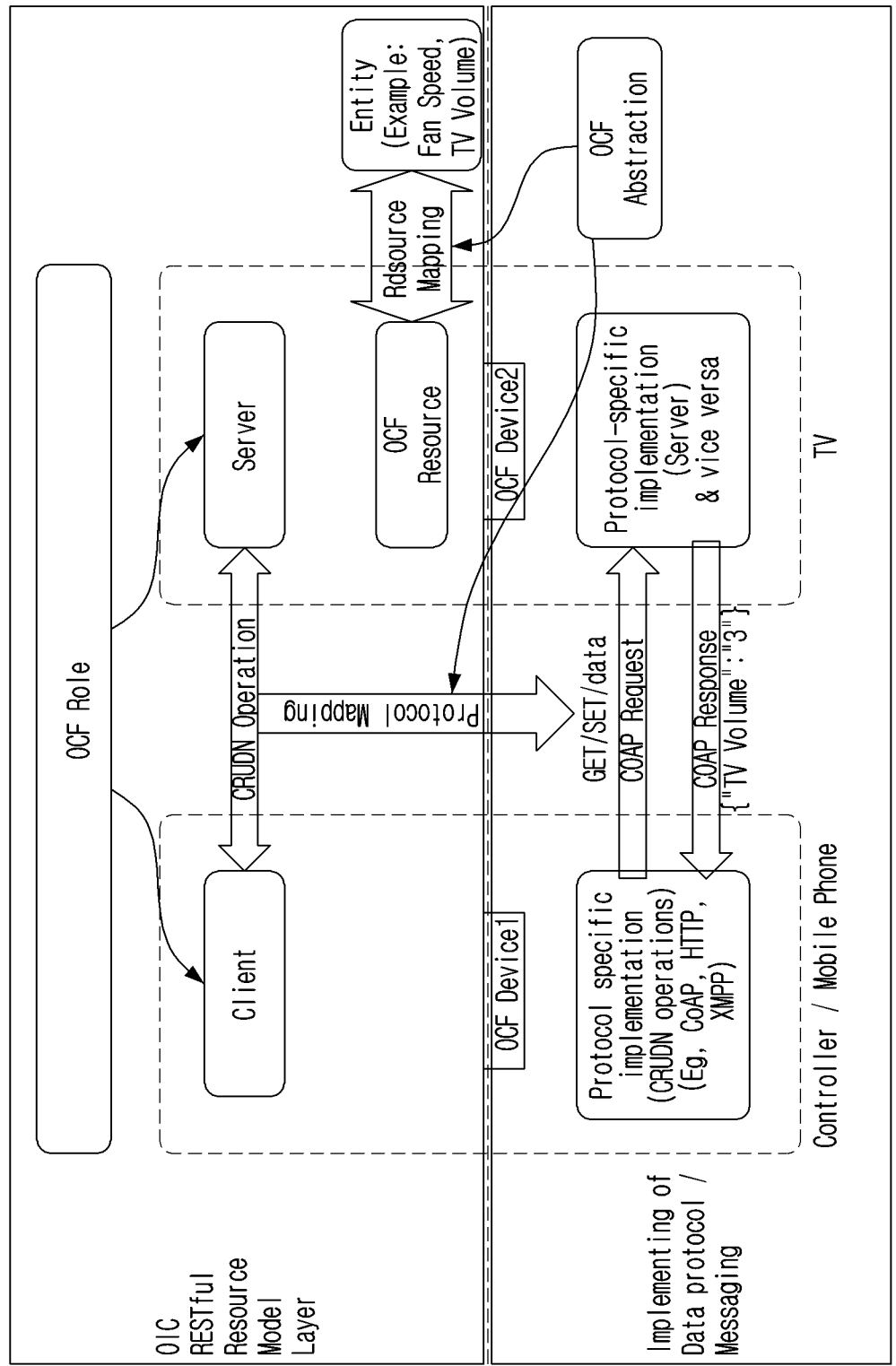
FIG. 2 illustrates an example existing Open Connectivity Foundation (OCF) architecture comprising two IoT devices.

As for terms used in this specification and the claims, general terms were selected, in consideration of the functions in the various embodiments of the disclosure. However, the terms may vary depending on the intention of those skilled in the art, legal or technical interpretation, or emergence of new technologies. Also, there are terms that were arbitrarily designated by the applicant, and the meaning of such terms may be interpreted as defined in this specification. Terms that are not specifically defined in the disclosure may be interpreted based on the overall content of this specification and common technical knowledge in the pertinent art.

Also, the same reference numerals or symbols described in each drawing accompanying this specification refer to components or elements performing substantially the same functions. For the convenience of explanation and understanding, such components or elements will be described by using the same reference numerals or symbols in embodiments different from one another. That is, even if all elements having the same reference numerals are illustrated in a plurality of drawings, the plurality of drawings do not mean one embodiment.

In addition, in this specification and the claims, terms including ordinal numbers such as "the first," "the second," etc. may be used for distinguishing elements. These ordinal numbers are used only to distinguish the same or similar elements from one another, and the meaning of the terms are not to be interpreted in a restrictive way due to use of such ordinal numbers. As an example, the orders of usage or the orders of arrangement, etc. of elements combined with such ordinal numbers are not to be restricted by the numbers. Also, depending on needs, each ordinal number may be interchangeably used.

In this specification, singular expressions include plural expressions, unless defined obviously differently in the context. Further, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Also, in the embodiments of the disclosure, terms such as "a module," "a unit," and "a part" are for referring to elements performing at least one function or operation, and these elements may be implemented as hardware or software, or as a combination of hardware and software. Further, a plurality of "modules," "units," and "parts" may be integrated into at least one module or chip and implemented as at least one processor, except when each of them needs to be implemented as independent specific hardware.

In addition, in the embodiments of the disclosure, the description that a part is connected with another part includes not only a case of direct connection, but also a case of indirect connection through another medium. Also, the description that a part includes an element means that another element may be further included, but not that another element is excluded, unless there is a particular opposing description.

Embodiments herein disclose methods and systems for achieving collaboration between resources of a plurality of Internet of Things (IoT) devices in an IoT ecosystem based on intent(s) associated with the resources. The IoT devices may be part of an IoT ecosystem, wherein one of the IoT devices in the IoT ecosystem acts as a controller. The resources of the IoT devices may be associated with intents and grouped together based on association with same intent. Variations in values of the resources, caused by user activity, events in the IoT devices, and the controller, may be monitored. The intents that are associated with the resources, whose values have changed, may be determined if a variation in the values of the resources is detected. The resources associated with the same intents that have been grouped together may be identified. Simultaneously, the controller may control the values of the identified resources based on a context. The intent-resource associations may be updated based on the variations, predefined intents associated with the resources, and impact of the variations in the IoT ecosystem.

Referring now to the drawings, and more particularly to FIGS. 3 through 8, where similar reference characters denote corresponding features consistently throughout the figures, example embodiments are described.

Figure 3:
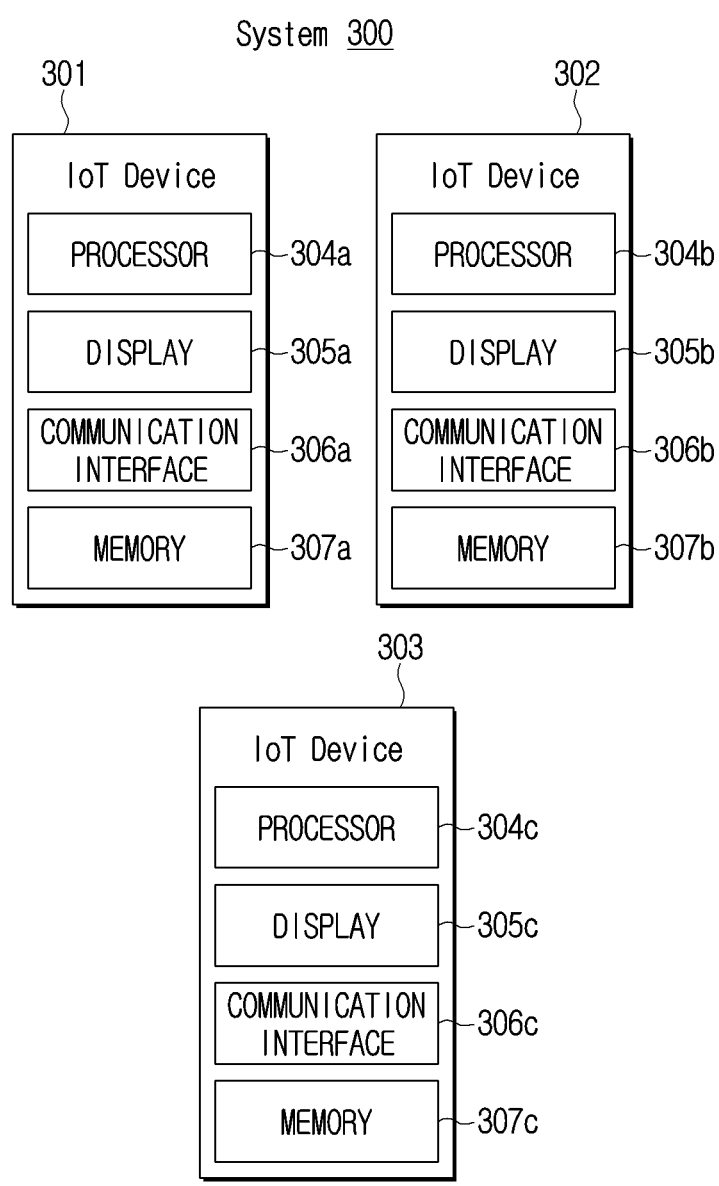
FIG. 3 illustrates an example system for controlling resources of IoT devices in an IoT ecosystem through collaboration between the resources of the IoT devices, according to embodiments.

FIG. 3 illustrates an example system 300 for controlling resources of IoT devices 301, 302, 303 through collaboration between the resources of the IoT devices 301-303, according to embodiments. As depicted in the example in FIG. 3, the system 300 includes three IoT devices 301, 302, and 303, forming an IoT ecosystem, wherein the IoT device 301 may act as a master or controller IoT device (e.g., performing the function of a controller device in the IoT ecosystem). The system 300 may also be herein referred to as an IoT ecosystem. For the sake of illustration in the example depicted in FIG. 3, only three IoT devices 301-303 have been depicted, but embodiments are not limited thereto and one or more IoT devices may be included in the IoT ecosystem 300. The IoT devices 302 and 303 may act as controller IoT devices. However, in one embodiment, only one IoT device among the IoT devices 301-303 in the IoT ecosystem 300 may act as the controller IoT device. Examples of the IoT devices 301-303 may include, but not limited to, a mobile phone, a bulb, a chimney (or kitchen chimney), a laptop, a smart refrigerator, a window blind, a television, a tablet, a fan, a wearable device, a dryer, an alarm, a music system, an air conditioner, robot cleaner, and so on.

The IoT devices 301-303 may include processors 304a, 304b, 304c, displays 305a, 305b, 305c, communication interfaces 306a, 306b, 306c, and memories 307a, 307b, 307c, respectively. Each of the processors 304a-304c may perform the functionalities of either the controller IoT device or a normal IoT device (e.g., a non-controller IoT device), wherein the controller IoT device may collaborate with normal IoT devices for control of the resources of the normal IoT devices. The processors 304a-304c may have the same internal structure. The processor 304a is configured to perform the functions of the controller IoT device 301 and the processors 304b and 304c are configured to perform the functionalities of normal IoT devices 302 and 303.

The IoT devices 301-303 may communicate with each other through the communication interfaces 306a-306c. The communication between the IoT devices 301-303 may be based on a communication protocol such as, for example but not limited to, a wired means, Wireless-Fidelity (Wi-Fi), Wi-Fi Direct, Zigbee, Bluetooth, Near Field Communication (NFC), Infrared, Zigbee mesh, Ultra Wideband (UWB), Z-wave, and so on.

Each of the IoT devices 301-303 may have a plurality of resources. For example, the television may have resources such as a brightness, a volume, a color, a contrast, a channel, a source, and so on. The bulb may have resources such as a power, a color, and a brightness. The air conditioner may have resources such as a power, a temperature, a mode, a fan speed, and so on. The memory 307a may store information about the resources of the IoT devices 302 and 303, such as a current state of the resources.

The processor 304a is configured to perform grouping of resources of the IoT devices 301-303 based on intents associated with the resources of the IoT devices 301-303. Examples of intents may be, but not limited to, noise, ambient light, eco-mode, security, adaptability, party, and so on. Each resource of each IoT device 301-303 may be associated with one or more intents and one or more intents may be associated with a single resource. For example, resources of brightness and color of an IoT device that is a hue bulb may be associated with an intent 'ambient light'. Similarly, a resource of a sound mode of a music player that is an IoT device may be associated with multiple intents such as 'noise' and 'party'.

The term "intent" may refer to an aspect of the impact or influence that may be made by a resource of the IoT device associated with the intent to the environment of the IoT ecosystem 300. For example, the resource of a volume of the IoT device television may be associated with the intent 'noise', because any variation in the volume of the television may impact the noise in the environment of the IoT ecosystem 300. Similarly, the resource of brightness of the IoT device bulb may be associated with the intent 'ambient light', because any variation in the brightness of the bulb may impact the ambient light of the environment of the IoT ecosystem 300. The memory 307a may store information of the resources and the corresponding possible intents.

The processor 304a may associate the resources of the IoT devices 301-303 with predetermined intents based on correlation between the intents and the resources. The correlation may be quantified based on the impact of variations in the values of the resources of the IoT devices 301-303 on the environment of the IoT ecosystem 300. For example, noise may be the predetermined intent associated with resources such as a volume of the television, a volume of the music system, a level of the chimney, a speed of the fan, and so on. In another example, the intent ambient light may be associated with the brightness of the bulb, brightness of the television, a position of the window blind, and so on. The grouping of the resources of the IoT devices may be performed based on the association of the resources with the same intent. The memory 307a may store information about the intents associated with each of the resources of the IoT device 301, and the IoT devices 302 and 303.

The processor 304a may monitor a variation in the values of the resources and a cause of the variation in the values of the resources. Each resource may have a value that may change according to user actions, instructions from the controller IoT device 301, and occurrences of events in at least one IoT device 301-303. The processor 304a may receive a communication about the variation in the values of the resources and the cause of the variation in the values of the resources. For example, the value of each of the resources of the television may change through adjustment by the user, changes made by the controller IoT device 301 (based on the assumption that the television is not the controller IoT device), and occurrences of events in other IoT devices 301-303. The processor 304a may derive new intents based on variations in the values of resources of at least one IoT device among the IoT devices 301-303. The processor 304a may associate the resources with the new intents. The memory 307a may store the new intents.

When a variation in the value of a resource of an IoT device among the IoT devices 301-303 is detected, the processor 304a may determine the intent associated with the resource. Consider that a user has turned on (value) the power (resource) of the air conditioner (IoT device). The air conditioner may be automatically powered on at a specific time set by the user. The automatic powering on may be considered as an occurrence of an event in the air conditioner. In another example, the controller IoT device 301 may control to turn on the power of the air conditioner, which may be the IoT device 302. The communication interface 306b of the IoT device 302 may inform the controller IoT device 301 about the change in value (off to on) of the resource 'power' in the IoT device 302 through the communication interface 306a. In another example, the IoT device 301 may determine the change in the value of the resource of the air conditioner 302 through IoT sensors in the IoT ecosystem 300. The IoT sensors may interact with the IoT devices 301-303 through the communication interfaces 306a-306c of the IoT devices 301-303.

The controller IoT device 301 (through the processor 304a) may determine the intent associated with the resource 'power' of the air conditioner IoT device 302. Consider that the determined intent is 'wake up'. Once the associated intent has been determined, the processor 304a may determine the IoT devices that are associated with the intent 'wake up' by checking the intent stored in the memory 307a. The processor 304a may retrieve from the memory 307a, the resources of the IoT devices associated with the intent 'wake up'. Consider that the processor 304a determines that the resources are, e.g., a power of a bulb, a power of a fan, a power of a music player, and a position of a window blind, are associated with the intent 'wake up'. The processor 304a may control the power of the bulb, the fan, and the music player, and the position of the window blind, based on a context. A context may be predefined to be matched with at least one intent or detection of change of a resource value, and the context may include information regarding an order in which at least one resource value is to be controlled and/or has a changed value. For example, according to a context, the processor may power on the bulb, the fan, and the music player, and open the window blind, based on detecting that the air conditioner 302 has been powered on. The processor 304a, through the communication interface 306a, may send instructions to the communication interfaces of the IoT devices, e.g., the bulb, the fan, the music player, and the window blind. The processors in the bulb, the fan, the music player, and the window blind may control to turn on the power of the bulb, the fan, the music player, and the processor of the window blind may control to open the window blind.

The processor 304a may update the predetermined intent-resource associations by learning the impact (or effects) of variations of the values of the resources of the IoT devices 301-303 on the IoT ecosystem 300.

According to an embodiment of the disclosure, the processor 304a may measure the influence that the change of at least one resource value exerts on an intent. Specifically, the processor 304a may acquire sensing data for at least one item associated with the intent. For example, the processor 304a may acquire sensing data regarding various items such as the size of a sound, the concentration of air pollution, the temperature, identification of an object, brightness, etc.

For this, the processor 304a may use sensing data acquired in at least one sensor included in the electronic device 301. Alternatively, the processor 304a may perform communication with an IoT device including a sensor configured to measure an item related with the intent and receive sensing data acquired in the sensor. Here, sensors that may be provided in each device may be various sensors such as a microphone, an optical sensor, an illumination sensor, an image sensor, an air quality sensor, a temperature sensor, etc., but embodiments are not limited thereto.

In an example, it is identified that sensing data of a microphone regarding 'the size of a sound' is changed according to an increase in the level of the fan, the processor 304a may define that the level of the fan is associated with the intent 'noise.'

In addition, the processor 304 may acquire sensing data for an item related with an intent while the intent is identified. Also, if it is identified that sensing data related with the identified intent is changed as the value of a specific resource was changed, the processor 304a may define (or identify) that the resource is associated with the identified intent.

For example, it is assumed that resources such as the volume of the TV, the level of the fan (or the fan speed), and the call state of the smartphone (or the telephone) are associated with an intent 'noise' If a call comes through the smartphone, the processor 304a may identify the intent as 'noise,' and perform automatic control such that the volume of the TV and the level of the fan are decreased.

Even if the intent is identified as 'noise,' the processor 304a may monitor whether values of other resources not associated with 'noise' are changed in addition to the aforementioned resources. Here, other resources may include not only other resources of the aforementioned devices (e.g., the TV, the fan, the smartphone), but also resources of at least one other IoT device (e.g. the robot cleaner).

The processor 304a may perform communication with IoT devices such as a speaker including a microphone for measuring the size of a sound related to 'noise,' and receive sensing data regarding the size of the sound. By using the received sensing data, the processor 304a may identify whether the size of the sound is changed according to the change of the values of the aforementioned other resources.

In a case where it is detected that the mode of the robot cleaner which is a resource that was previously not associated with 'noise' is changed to a cleaning mode, and it is identified that the size of the sound identified through the sensing data is increased in accordance to the changed mode of the robot cleaner, the processor 304a may newly define the mode of the robot cleaner as a resource associated with the intent 'noise.'

Afterwards, if a call comes, the processor 304a that identifies the intent as 'noise' may automatically control not only the volume of the TV and the level of the fan, but also the mode of the robot cleaner.

A resource may be associated with an intent based on the correlation between the intent and the resource. However, the correlation may increase or decrease over a period of time based on variations in the values of the resources caused by the user actions, events in the IoT devices 301-303, and instructions from the controller IoT device 301; and the impact of the variation on the environment of the IoT ecosystem 300, as measured by the IoT sensors. The processor 304a may associate the intents with the resources, if the correlation between the intent and the resource increases (e.g., to be greater than or equal to a threshold); and similarly disassociate the existing intent-resource associations, if the correlation between the intent and the resource decreases (e.g., to be less than a threshold).

In an example, consider that the correlation between a resource 'television mode' and the intent 'ambient light' is low. Consider that the user has changed the television mode from a normal mode to a theatre mode. The variation in the mode of the television may lead to variations in the values of resources of other IoT devices, which may not be associated with the intent 'ambient light'. The processor 304a may detect the variations in the values of the resources of the other IoT devices and the impact of the variations on the ambient light of the IoT ecosystem. Consider that the brightness of the bulb has increased due to the variation in the resource television mode. The resource 'brightness' of the IoT device bulb may be associated with the intent 'ambient light'. Thus, the variation of the resource 'television mode' has impacted the ambient light of the IoT ecosystem. Thereafter, the processor 304a may assign a score to the correlation between the resource 'television mode' and the intent 'ambient light', based on the impact on the of the IoT ecosystem. For example, the score may be proportional to the magnitude of the impact.

The processor 304a may measure a cumulative impact of the variations in the values of the resources on the ambient light. The cumulative impact is based on the previous correlation between a resource 'television mode' and the intent 'ambient light' and the currently assigned score of correlation. The cumulative impact may alter the score assigned to the correlation. If the score increases beyond a predefined threshold, the resource 'television mode' may be associated with the intent 'ambient light'. The cumulative impact may prevent improper intent-resource associations.

As an example, it is assumed that a direct correlation 'a' between 'mode' which is the resource of the TV and the intent 'ambient light' is set as 10, and a direct correlation between 'brightness' which is the resource of the bulb and the intent 'ambient light' is set as 50. Here, if the threshold of the correlation for associating an intent and a resource is assumed as 40, there may be a situation in which the intent 'ambient light' is currently associated with the 'brightness' of the bulb having a correlation of 50, but is not associated with the 'mode' of the TV having a correlation of 10.

In such a situation, based on a detection of the change of the ambient light (e.g., measured through at least one sensor device, etc.) as the 'mode' of the TV is changed to 'a sport mode' value, an indirect correlation 'a1' between the 'mode' and the 'ambient light' may be identified (or calculated) as 20. Here, as the influence that the change of a resource value exerts on the IoT ecosystem (e.g., the change of the 'ambient light') is greater, the indirect correlation may be calculated to be greater. The direct correlation is a numerical value indicating a current correlation between a resource and an intent, and the indirect correlation may be conceptually interpreted as a numerical value indicating a possible correlation between the resource and the intent, which may be reflected in updating the current correlation.

As an example, through the following formula defined in advance, the direct correlation between the 'mode' of the TV and the 'ambient light' may be updated.

$$a \times w + a1 \times w1 = a$$

For example, in a case where the constant w is 0.7, and the constant w1 is 0.3, the direct correlation between the 'mode' of the TV and the 'ambient light' may be updated to be 13 (i.e., 10×0.7+20×0.3).

Here, in a case the user adjusted 'brightness' which is the resource of the bulb after the 'mode' of the TV is changed (e.g., within a predetermined time period), a substantial change of the 'ambient light' may be detected. Here, not only the indirect correlation between the 'brightness' of the bulb and the 'ambient light' but also the indirect correlation between the 'mode' of the TV and the 'ambient light' may be calculated as 90.

As a result, the direct correlation between the 'mode' of the TV and the 'ambient light' may be updated to be 36 (i.e., 13×0.7+90×0.3), and the direct correlation between the 'brightness' of the bulb and the 'ambient light' may be updated to be 62 (i.e., 50×0.7+90×0.3).

Like the aforementioned method, the correlation and association between a resource and an intent may be defined for various resources and intents. Also, resources associated with the same intent (e.g., having correlation greater than or equal to a threshold with the intent) may be defined to be included in the same group.

The processor 304a may update a preset intent-resource relation by using relations among the resources of the IoT devices 301-303 in the IoT ecosystem 300.

According to an embodiment of the disclosure, while a change of the value of the first resource among a plurality of resources associated with the first intent is detected, the processor 304a may monitor the change of the values of the remaining resources excluding the first resource among the plurality of resources associated with the first intent. Here, the resources of which values that are not changed as the value of the first resource is changed among the remaining resources may be defined as not being associated with the first intent any longer.

For example, it is assumed that resources such as the volume of the TV, the level of the fan (or the fan speed), and whether the smartphone (or the telephone) performs a call are associated with an intent 'noise'. In this case, whenever it is detected that a call comes through the smartphone, the processor 304a may identify the intent as 'noise.'

In a case where a user instruction for reducing the volume of the TV is detected whenever a call comes, but a user instruction for adjusting the level of the fan is not detected, the processor 304a may define that the level of the fan is not associated with the 'noise' any longer.

Alternatively, in case where the processor 304a controls the IoT devices (e.g., the TV, the fan) to reduce the volume of the TV and the level of the fan according to the intent 'noise' when a call comes, but a user instruction for not reducing the level of the fan or an instruction for increasing the reduced level of the fan again immediately is detected, the processor 304a may determine that the level of the fan is not associated with the 'noise' any longer.

According to an embodiment of the disclosure, in a case where the value of the second resource associated with the second intent (e.g., different from the first intent) is changed based on the change of the value of the first resource associated with the first intent, the second resource may be defined to be associated with the first intent (in this case, the second resource may be defined to be associated with each of the first intent and the second intent, or defined to be associated with only the first intent).

That the value of the second resource is changed based on the change of the value of the first resource may mean, for example, that the value of the second resource is changed within a predetermined time (e.g., a relatively short time) from the time when the value of the first resource is changed.

As an example, a situation where an intent 'noise' and a resource 'sound mode' of a music player are associated, and an intent 'cleaning' and resources including the level of the fan and the modes of the robot cleaner are associated may be assumed.

In this case, if the 'sound mode' of the music player is activated, the processor 304a may identify the intent as 'noise.' Meanwhile, in a case where a user instruction for changing the mode of the robot cleaner from a cleaning mode to a charging mode is detected shortly after the 'sound mode' of the music player is activated (e.g., within a predetermined time), the processor 304a may define that the mode of the robot cleaner is associated with the intent 'noise.' As a result, the mode of the robot cleaner may be defined to be associated with each of the 'noise' and the 'cleaning.'

FIG. 3 shows example components of the system 300, but it is to be understood that embodiments are not limited thereon. In other embodiments, the system 300 may include less or more number of components. Further, the labels or names of the components are used only for illustrative purpose and do not limit the scope of the disclosure. One or more components may be combined together to perform same or substantially similar function in the system 300.

Figure 4:
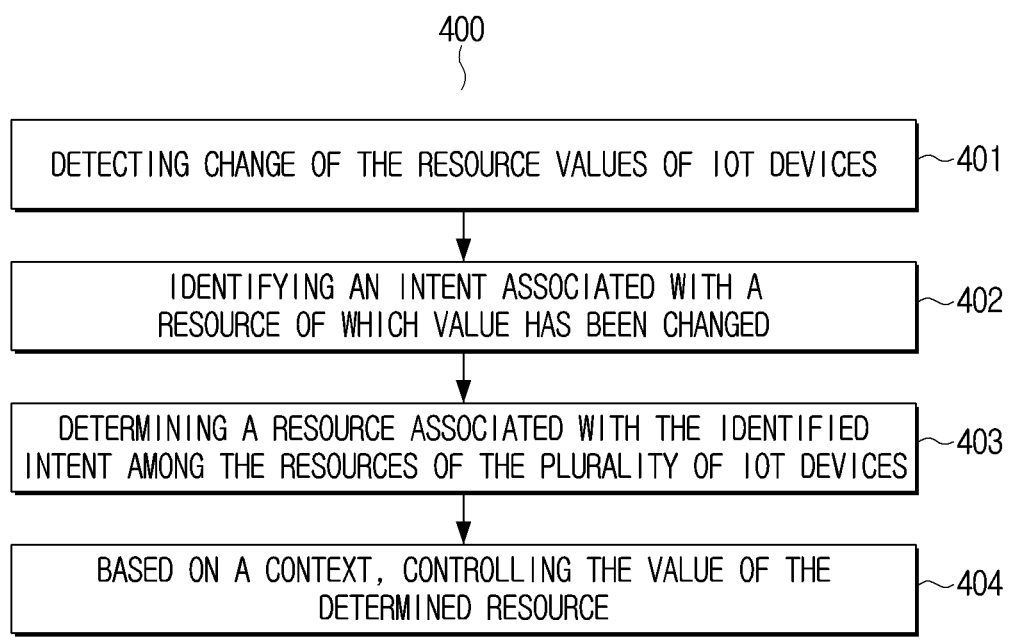
FIG. 4 is a flowchart illustrating a method for controlling resources of IoT devices through collaboration between the resources of the IoT devices according to embodiments.

FIG. 4 is a flowchart 400 illustrating a method for controlling resources of the IoT devices through collaboration between the resources of the IoT devices according to embodiments.

Referring to FIG. 4, in the control method according to the disclosure, change of a resource value of at least one IoT device included in a plurality of IoT devices included in an IoT ecosystem may be detected at operation 401. Here, information on the change of the resource value in an IoT device may be transmitted to an IoT device which is a control device, and the control device may detect the change of the resource value. Additionally and/or alternatively, in a case where the resource value of an IoT device which is a control device is changed, the IoT device which is a control device may detect the change.

Also, in the control method according to the disclosure, an intent associated with a resource of which value is changed may be identified at operation 402. As an example, in a case where a resource of which value is changed is included in a group of resources associated with a specific intent, the specific intent may be identified as an intent associated with the resource of which value is changed.

Further, in the control method according to the disclosure, a resource associated with the identified intent may be determined among the resources of the plurality of IoT devices in the IoT ecosystem at operation 403. As an example, in a case where a group of resources associated with the identified intent is defined, at least one resource included in the group may be determined as a resource associated with the identified intent.

In addition, in the control method according to the disclosure, the value of the determined resource may be controlled based on a context at operation 404. For example, according to a context corresponding to the identified intent, the value of the determined resource may be controlled.

Hereinafter, referring to FIG. 5, an example of the control method in the IoT ecosystem 300 in FIG. 3 according to the disclosure will be described in more detail.

Figure 5:
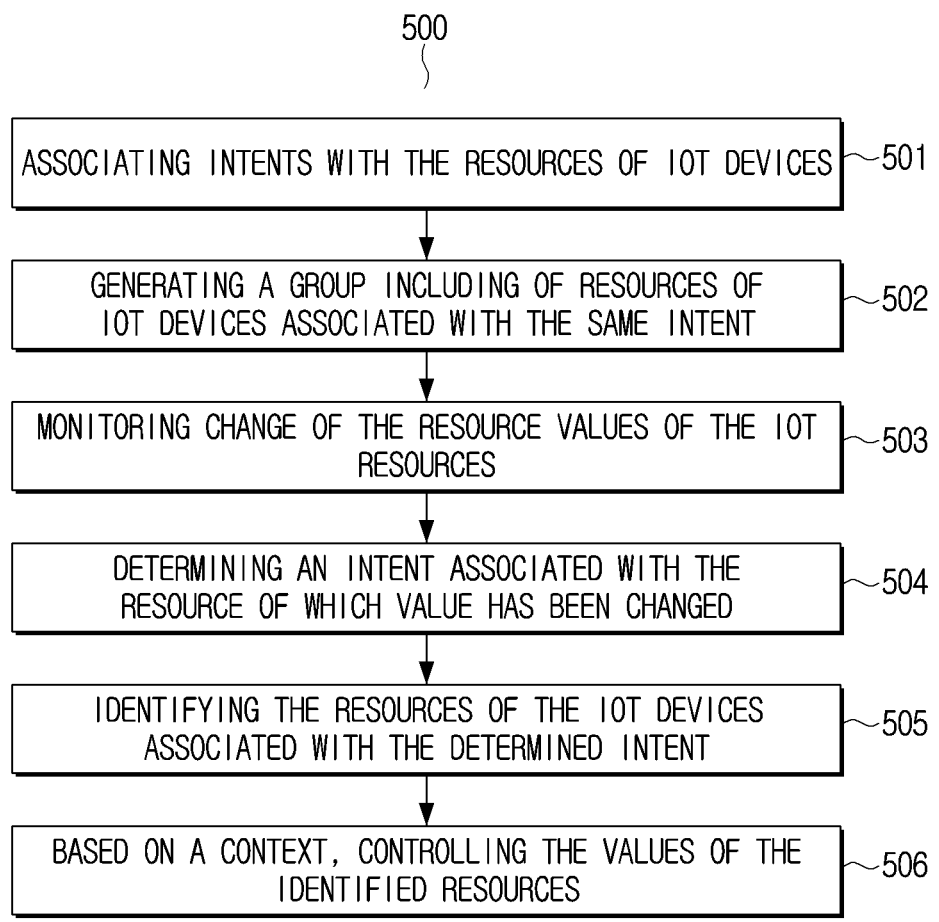
FIG. 5 is a flowchart illustrating a method for controlling resources of IoT devices through collaboration between the resources of the IoT devices, according to embodiments.

FIG. 5 is flowchart 500 depicting a method for controlling resources of the IoT devices 301-303 through collaboration between the resources of the IoT devices 301-303, according to embodiments. At 501, the method includes associating intents with resources of the IoT devices 301-303. The association between the intents and the resources may be based on the impact of the resources on the IoT ecosystem 300 environment. The association between the intents and the resources may be initially predetermined based on historical data based on past usage of similar and/or the same IoT devices (e.g., by a predetermined user or by a plurality of users) and the impact the resource variations have on the IoT ecosystem 300 environment. The controller IoT device 301 may store the intents and the resources associated with the intents.

At 502, the method includes creating groups, wherein each group comprises of resources of the IoT devices associated with the same intent. The grouping of resources based on intents allows achieving resource collaboration, which allows simultaneous control of resources of the plurality of IoT devices 301-303. If there is a variation in the value of a resource of one of the IoT devices 301-303, the resource of the one of the IoT devices 301-303 and resources of other IoT devices 301-303, associated with the same intent, may be simultaneously controlled. The controller IoT device 301 may store the groups of resources associated with same intents.

At 503, the method includes monitoring variations in the values of the resources of the IoT devices 301-303. The variations in the values of the resources may occur as a result of the user changing the values of the resources, events occurring in the IoT devices 301-303, and the controller IoT device 301 controlling the values of the resources, for example, but embodiment are not limited thereto. The IoT devices 302 and 303 may inform the controller IoT device 301 about any variation in value of any of the resources of the IoT devices 302 and 303.

The variation in the values of resources (associated with intents) may lead to variations in values of other resources (not necessarily the resources of the IoT devices 301-303 that are associated with the same intents) of the IoT devices 301-303. The variations of the values of the other resources may impact the IoT ecosystem 300 environment. Based on the impact due to the variations in the in values of the other resources, intent-resource associations may be updated.

At 504, the method includes determining intents that are associated with the resources undergoing variation in the values. At 505, the method includes identifying the resources of the IoT devices 301-303 associated with the determined (same) intents. Once the intent of a resource, whose value has undergone a change, is determined, the resources that are associated with the same intents (of the same IoT device or other IoT devices) may be identified. The controller IoT device 301 may retrieve the resources that are associated with the same intent.

At 506, the method includes controlling the values of the identified resources based on a context. The context may specify the order in which the changes are to be applied in the values of each of the identified resources (associated with the same intent as that of the resource that has undergone a change in value). Therefore, due to the collaboration between the resources of the IoT devices 301-303, the resources of the IoT devices 301-303 may be controlled by the master/controller IoT device 301.

The operations in the flowchart 500 may be performed in the order presented, in a different order, or simultaneously. Further, in some embodiments, some actions listed in FIG. 5 may be omitted, replaced, or modified.

Figure 6:
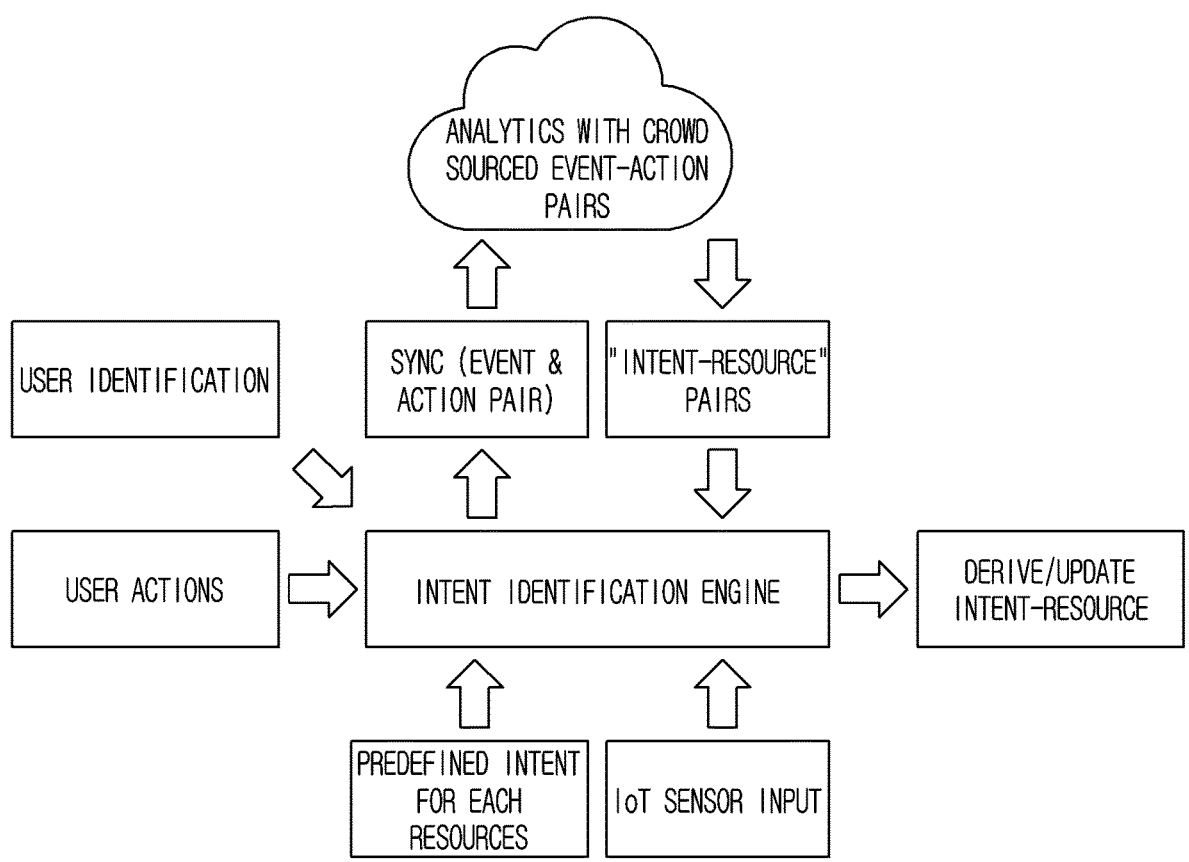
FIG. 6 is a block diagram depicting the means used for deriving intents that are currently associated with resources of the IoT devices, and updating the existing intent-resource associations, according to embodiments as disclosed herein.

FIG. 6 is a block diagram depicting the means used for deriving intents that are currently associated with resources of the IoT devices 301-303, and updating the existing intent-resource associations, according to embodiments as disclosed herein. As depicted in FIG. 6, the deriving the existing intent-resource associations and updating the existing intent-resource associations may be performed using an intent identification engine. In an embodiment, the intent identification engine may be located in the processor (304a-304c) of the IoT device (301-303). The intent identification engine may recognize the user. The intent identification may be generalized for all users or personalized for each user. The user may be identified using at least one of biometric sensor, facial recognition, voice recognition, user accounts, and so on.

Thereafter, the intent identification engine may identify the actions performed by the users. The actions are identified to detect whether variations have occurred in the values of the resources of the IoT devices (301-303) due to user actions. The intent identification engine may identify events in the IoT device(s) (301-303) that have caused variations in the values of the resources of the IoT devices (301-303). The intent identification engine may identify whether the master IoT device (301-303) has caused variations in the resources of the IoT devices (301-303).

The intents may be pre-associated with specific resources of the IoT devices 301-303 based on characteristics of the specific resources. For example, the intent may be associated with the resource volume. The intent identification engine may receive the pre-associated intent-resource pairs. Based on the pre-associated intent-resource pairs, the intent identification engine may derive the intent that is currently associated with the resources whose values had undergone variations due to user actions, events in the IoT devices 301-303, actions performed by the master IoT device.

The intent identification engine may determine an intent associated with a resource of an IoT device (301-303) when a variation is detected in the value of the resource of the IoT device (301-303). The intent identification engine may identify whether the variation is caused by an event in the IoT device (301-303) or whether an action is initiated by the master IoT device (301-303), which has caused the variation in the resource of the IoT device (301-303).

The intent identification engine may receive inputs from IoT sensors, which may report a variation in a value of a resource in one of the IoT devices (301-303) and the impact of the variation in on the IoT ecosystem. Based on the inputs, the intent identification engine may determine whether the intent that is currently associated with the resource is appropriate, or whether the current intent-resource association needs to be updated. The intent identification engine may send queries to cloud servers to retrieve analytics associated with crowd sourced event-action pairs. This allows the intent identification engine to determine the initial correlation between intent-resource pair.

The intent identification engine may further detect whether there are variations in values of other resources of other IoT devices (301-303) that are associated with another intent, due to the variation of the value of the resource of the IoT device (301-303). The intent identification engine may determine the effects on the IoT ecosystem due to the variation of the value of the resource of the IoT device (301-303), and the variations of the values of the other resources of the other IoT devices (301-303) associated with the other intent. If the impact is significant, the current correlation, and thereby the actual correlation, between the resource of the IoT device (301-303) and the other intent (associated with the resources of other IoT devices (301-303) which have undergone variations due to the variation of the resource of the IoT device (301-303)) will be high. Therefore, the intent identification engine may associate the resource with the other intent or disassociate the resource from the currently associated intent based on the effect on the IoT ecosystem.

Figure 7:
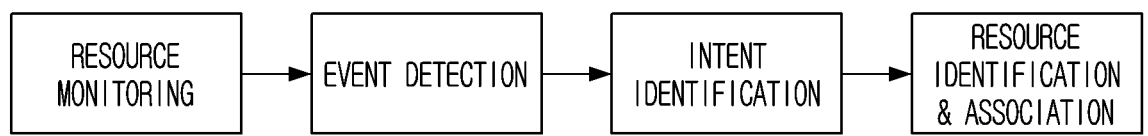
FIG. 7 is a block diagram depicting a means for identifying resources in the IoT devices that may be associated with a particular intent, according to embodiments as disclosed herein.

FIG. 7 is a block diagram depicting a means for identifying resources in the IoT devices 301-303 that may be associated with a particular intent, according to embodiments as disclosed herein. The IoT ecosystem includes a plurality of IoT devices 301-303. Each of the plurality of IoT devices 301-303 includes at least one resource. For example, the resources of the IoT device TV include volume, brightness, color, and so on. Each of the resources may have one or more states or values. For example, the resource brightness level of the IoT device hue bulb may have a particular value.

The embodiments include monitoring variations in the values of the resources. The IoT ecosystem includes a master IoT device 301 and other IoT devices 302-303. The communication channel between the IoT devices 302-303 and the master IoT device 301 may be, but not limited to a wired channel, a wireless channel (such as Bluetooth, Wi-Fi), a cloud, and so on. In an embodiment, the master IoT device 301 may act as an IoT controller. In another embodiment, the master IoT device may be any of the IoT devices (301-303), and the computing overhead may be offloaded to an IoT edge computing device or server. In that scenario, an agent needs to be present in the master IoT device (301-303) for synchronizing the master IoT device (301-303) with the computing device.

The master IoT device (IoT controller) 301 monitors the resources of all other IoT devices 302-303 periodically and stores the states of the resources of the other IoT devices 302-303 in the memory 307a. The other IoT devices 302-303 communicate variations in the values of the resources to the master IoT device 301, or the master IoT device 301 may query (Polling) about the variations in the values of the resources. When there is a variation in the value of a resource of an IoT device (302-303), the master IoT device 301 may store the updated value in the memory 307a.

The variations in the values of the resources of the plurality of IoT devices occur due to the user performing a set of actions on the plurality of IoT devices 301-303, or triggering of external events in the plurality of IoT devices 301-303. For example, the embodiments include detecting that (due to an action by the user or an external event) the video mode of the TV has changed to 'theater' from any other mode. The master IoT device 301 may obtain or receive the variations in the values of the resources of from the IoT devices 302-303. The master IoT device 301 may report the event detections and the corresponding variations in the values of the resources of the IoT devices 302-303 to the intent identification engine. Once the master IoT device 301 obtains/receives the event changes the corresponding variations in the values of the resources of the IoT devices 302-303, the master IoT device 301 may derive the intent that is associated with the resources which have undergone variations in their corresponding values or state changes.

The intent identification engine may derive the intent based on the predefined intent associated with the resources of the plurality of IoT devices 301-303, which have undergone variations in their corresponding values or state changes. Once intent is derived, the master IoT device 301 identifies the resources of all other IoT devices (301-303) which are associated with the derived intent.

The intent identification engine may update existing intent-resource associations by determining the resources of the plurality of IoT devices 301-303, which have undergone variations in their corresponding values due to variation in the value of a resource of an IoT device 303; and the impact of the variations of the resources of the plurality of IoT devices 301-303 on the IoT ecosystem. The resource of an IoT device 303 may be associated with an intent, which is associated with the resources of the plurality of IoT devices 301-303, which have undergone variations in their corresponding values due to the variation in the value of the resource of the IoT device 303.

The master IoT device may group or categorize the resources of one or more IoT devices (301-303) associated with the same intent. If one of the resources undergoes variations or state changes, then the resources that are associated with the same intent may be controlled based on a context. In an embodiment, the master IoT device 301 controls the resources of the IoT devices 301-303, which have been categorized based on intent association, either automatically or by displaying a visual interface to the user, to enable the user to control the resources of the IoT devices 301-303.

In an embodiment, there may be multiple resources in an IoT device (301-303) which are associated with the same intent. In an embodiment, there may be multiple intents that are associated with a single resource of a particular IoT device (301-303) after the categorization.

Figure 8:
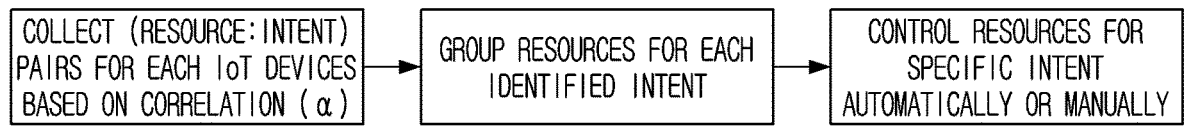
FIG. 8 is a block diagram depicting a means for identifying the intents that are associated with particular resources of the IoT devices and grouping the resources of the IoT devices that are associated with the same intent, according to embodiments as disclosed herein.

FIG. 8 is a block diagram depicting a means for identifying the intents that are associated with particular resources of the IoT devices 301-303 and grouping the resources of the IoT devices 301-303 that are associated with the same intent, according to embodiments as disclosed herein. The embodiments include identifying the intents that are associated with each of the resources of the plurality of IoT devices 301-303. The embodiments include determining the correlations (a) of each of the resources of each of the plurality of IoT devices 301-303 with each of the intents (see table 1). In an embodiment, the intent identification engine may compute the current values of the correlations, which are dependent on the previous values of the correlations, factored by predefined weights. In an example, the intent identification engine may compute the correlation between the intent noise and the resource volume of the IoT device TV. Similarly, the intent identification engine may compute the correlation between the intent ambient light and the resource brightness of the IoT device hue bulb.

Based on the values of the correlations, the resources may be associated with the intents. The embodiments include grouping the resources that are associated with the same intent. For example, the intent ambient light may be associated with the resources brightness and colour of the hue bulb, the resource video mode of the TV, and the resource position of the window blind. The embodiments include grouping the resources, associated with the same intent, based on at least one criterion. In an embodiment, N resources, which are having the highest correlation with a particular intent are associated with the intent and grouped together. In an example, three resources having the highest correlation with a particular intent are grouped together. In another embodiment, the resources, which have been recently identified to have a high degree of correlation with a particular intent, may be grouped with other resources that are associated with the same intent. In yet another embodiment, if the value of correlation between a resource and a particular intent is greater than 80, the embodiments include automatically grouping the resource with other resources that are associated with the same intent.

When the embodiments detect a variation in the value of a resource associated with a particular intent, the embodiments include controlling the resources that are associated with the same intent. Based on the specific intent, the grouped resources may be either controlled automatically or displayed in a dashboard user interface for manual control by the user.

Figure 9:
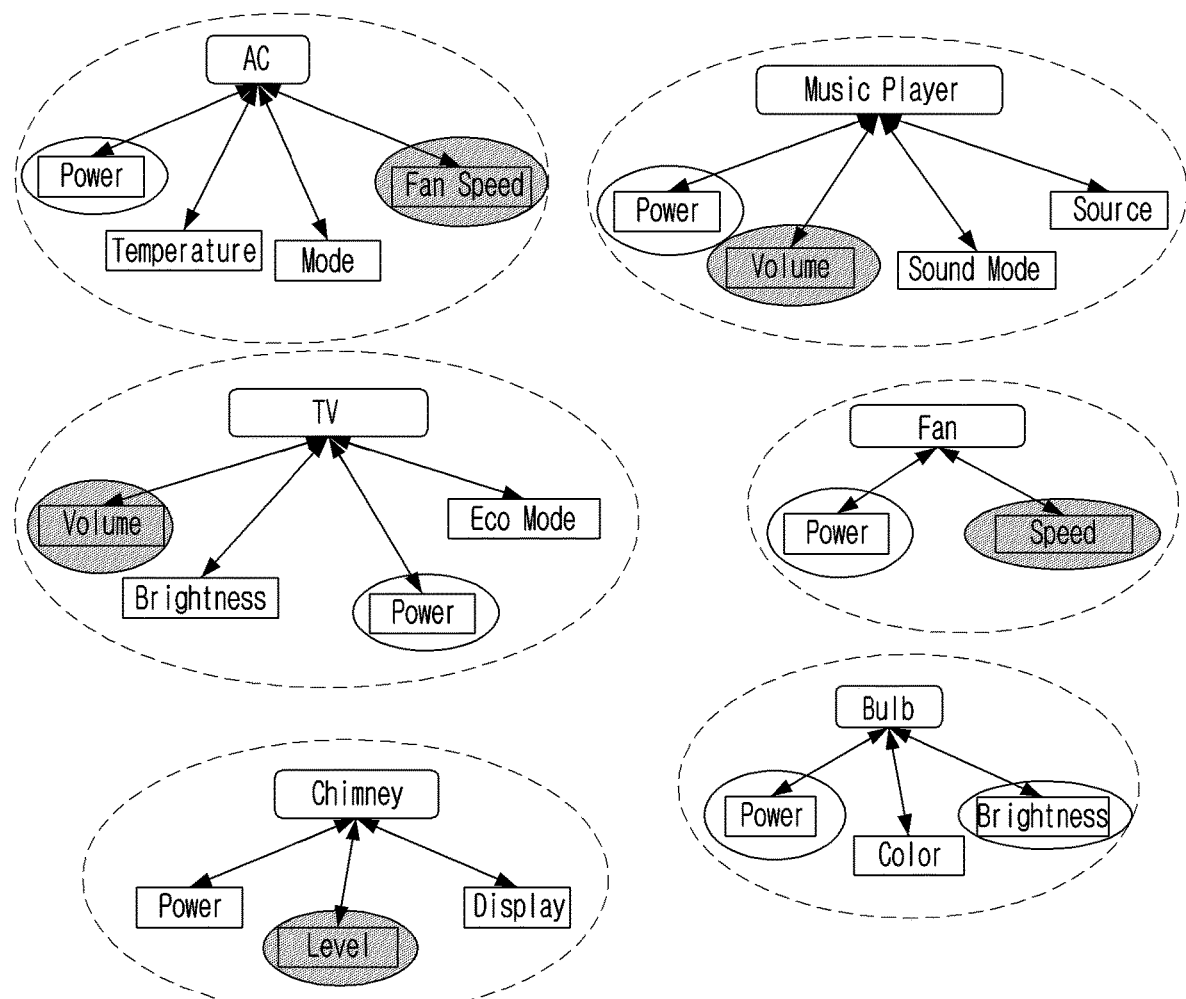
FIG. 9 illustrates an example of grouping of resources of IoT devices in an IoT ecosystem based on an association of intents with the resources of the IoT devices, according to embodiments.

FIG. 9 illustrates an example grouping of resources of a plurality of IoT devices in an IoT ecosystem based on association of intents with the resources of the IoT devices in the IoT ecosystem, according to embodiments. As shown in FIG. 9, the IoT ecosystem comprises devices such as a music player, an air conditioner (AC), a television (TV), a fan, a bulb, and a chimney. One IoT device, among all of IoT devices in the IoT ecosystem, may be considered as the IoT master/controller device. A user may control other IoT devices in the IoT ecosystem through the IoT controller device. Each IoT device may include a plurality of resources. For example, the music player may include resources, e.g., a power, a volume, a sound mode and a source. The AC may include sources such as a power, a temperature, a mode, and a fan speed. The TV may include resources such as a brightness, a volume, a power, and an eco mode. The fan may include resources such as a power and a speed. The bulb may include resources such as a power, a color and a brightness. The chimney may include a power, a level, and a display. Each resource of each IoT device may be associated with one or more intents.

Consider an intent 'wake up'. The resources, e.g., the power of the AC, the power of the fan, the power of the TV, the power of the music player, the power of the bulb, and the brightness of the bulb may be grouped together and associated with the intent 'wake up'. The grouping of the resources allows resource collaboration, wherein the grouped resources may be controlled together. The embodiments include adjusting the values of the resources that are associated with the intent 'wake up' based on a context. The context may refer to the adjustment of the values of the resources, associated with the intent 'wake up'. The context may be, for example when a user wakes up from sleep, the values of the resources are adjusted such that the power of the AC is turned on, i.e., powered on; the fan, the TV, the bulb, and the music player are powered on; and the brightness of the bulb is increased.

Consider another intent 'noise'. The resources, e.g., the level of the chimney, the volume of the TV, the fan speed of the AC, the volume of the music player, and the speed of the fan may be associated with the intent 'noise'. The values of the resources associated with the intent 'noise' are adjusted based on a context. The context may be, for example when a phone call is received, and the adjustment may be that the level of the chimney, the volume of the TV, the fan speed of the AC, the volume of the music player and the speed of the fan are reduced.

The association of the intents with the resources of the IoT devices in the IoT ecosystem may be predetermined. Based on information about a pattern of usage of IoT devices by other users, which may be determined over a period of time, the intents may be associated with the resources of the IoT devices (this is, when the IoT devices are used for the first time). The embodiments include identifying a correlation between the intents and resources through monitoring of a pattern of usage of the IoT devices. The embodiments include monitoring the adjustment of values of the resources by the user of the IoT devices and detecting changes in the values of the resources by IoT sensors. The embodiments include determining a correlation between intents and resources based on variations in the values of resources, crowd sourced inputs, and the predetermined association of the intents with the resources. If the correlation is above a predefined threshold, the intents and resources may be associated. The embodiments of the disclosure include re-association between the intents and resources by modifying existing intent-resource associations, which may increase or decrease the number of resources that are grouped together and/or collaborated based on association with a particular intent.

The embodiments include triggering the adjustment of the values of the resources based on, for example but not limited to, inputs from IoT sensors (e.g., detecting that brightness of the bulb is high) in the IoT environment, user activity (e.g., user turning on the TV), crowd sourced inputs (e.g., activity of other users), occurrence of events (e.g., receiving a phone call), and predetermined intents associated with resources.

Figure 10:
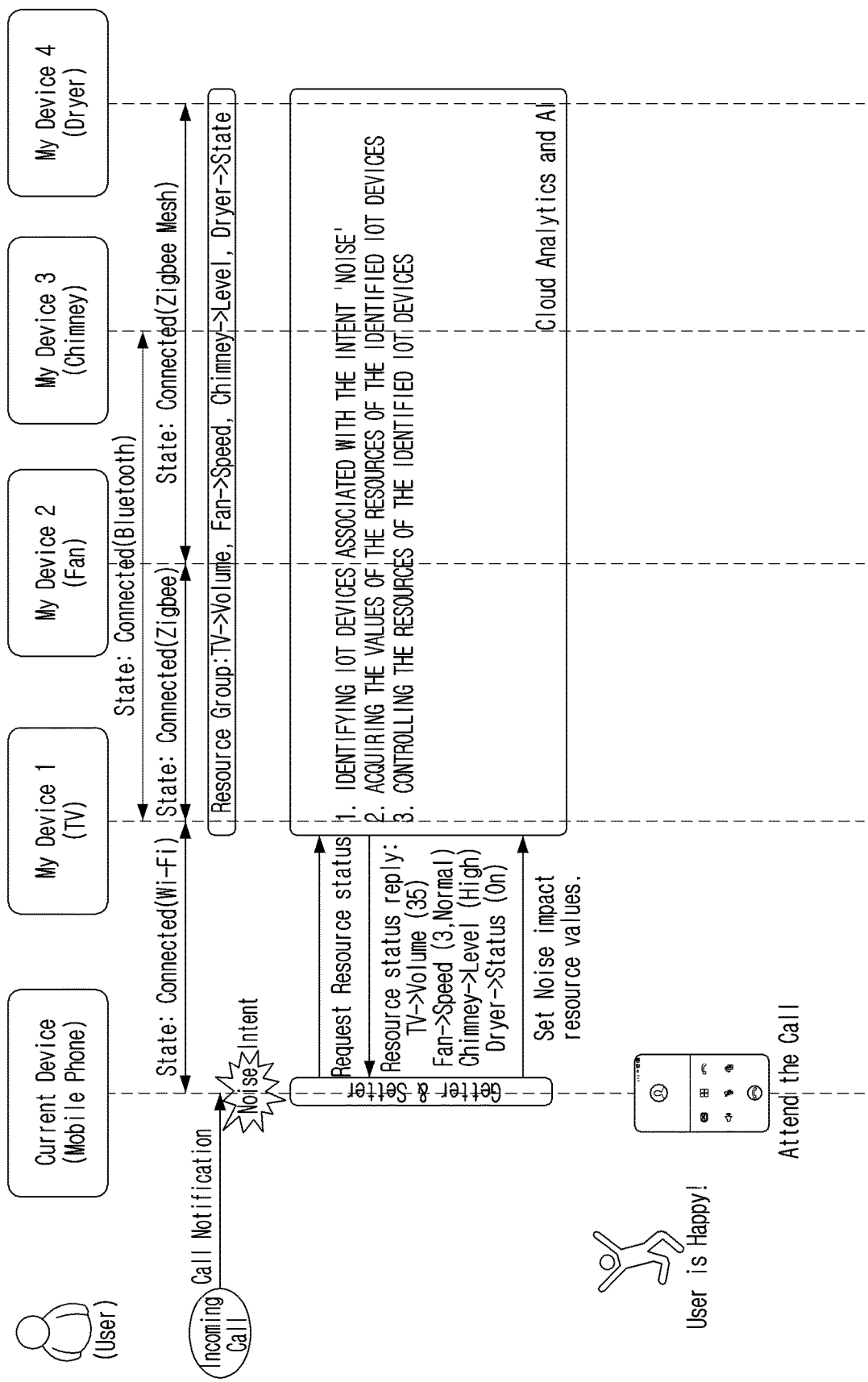
FIG. 10 is an example sequence diagram illustrating controlling of resources of a plurality of IoT devices based on identified intends using an IoT controller device, according to embodiments.

FIG. 10 is an example sequence diagram depicting control of resources of a plurality of IoT devices based on identified intents using an IoT controller device, according to embodiments. Consider that an IoT ecosystem comprises a mobile phone, a TV, a chimney, and a dryer. The mobile phone may be the IoT controller device. The devices in the IoT ecosystem may be connected to each other using, for example but not limited to, Wi-Fi, Zigbee, Bluetooth, and Zigbee mesh. The mobile phone and the TV may be connected using Wi-Fi. The TV and the fan may be connected using Zigbee. The TV and the chimney may be connected using Bluetooth. The fan and the dryer may be connected using Zigbee mesh.

The resources, e.g., a volume of the TV, a speed of the fan, a level of the chimney, and a state of the dryer, may be grouped together using the intent 'noise'. The volume of the TV, the speed of the fan, the level of the chimney, and the state of the dryer may contribute to noise in the environment of the IoT ecosystem. Therefore, the intent 'noise' may be associated with the above resources. Consider that the user of the mobile phone receives a call. The user receiving a call may be considered as an event occurring in the mobile phone. In response to receiving the phone call, the user may lower the volume of the TV. Thus, the value of the resource volume decreases. The embodiments include identifying the intent based on the occurrence of the event (e.g., arrival of the phone call) and change in the value of the volume of the TV (e.g., user adjusting or decreasing the volume of the TV). As the event "arrival of the phone call" and the resource "volume" are associated with the intent 'noise', the intent may be identified as 'noise'.

The mobile phone may identify the IoT devices in the IoT ecosystem associated with the intent 'noise'. The identified devices may be a fan, a chimney, and a dryer. The mobile phone may obtain the values of the resources (a speed of fan, a level of chimney, a state of dryer) of the identified IoT devices associated with the intent 'noise'. The mobile phone may control the resources of the identified IoT devices by adjusting the values based on a context. This is possible because of collaboration between the resources of the IoT devices in the IoT ecosystem. The context may be to reduce the speed of the fan and the level of the chimney, and switch the dryer off.

The TV, the fan, the chimney, and the dryer may contribute to noise, which are likely to disturb the user attending the call. The user, through the mobile phone, may simultaneously control the resources of the TV, the fan, the chimney, and the dryer. Thus, the user may seamlessly attend the call received on the mobile phone.

A context may fall under a process or a guideline for changing the value of at least one resource associated with an intent, in a case where a specific intent is identified.

For example, a context may include information on at least one resource of which value is to be changed as the intent is identified among resources associated with the identified intent. Specifically, a context may include information regarding the value of which resource is to be changed as the intent is identified. In an example embodiment, the values of all resources associated with the intent may not be changed as the intent is identified.

A context may include information on a target value of at least one resource to which the value of the at least one resource is to change and/or information on an order in which values of resources are to be changed, etc.

One or more contexts may be predetermined for each intent, but may be updated based on the pattern of usage of the IoT devices and a user behavior. For example, in a state that the intent (e.g., that is set according to a user input for an IoT device which is a control device or identified according to a change of the resource value of at least one IoT device based on an occurrence of an event) is 'noise,' if it is identified that the user reduced the TV volume and reduced the level of the fan afterwards, the context corresponding to the 'noise' may be defined/updated in the order of reduction of the TV volume and reduction of the level of the fan.

The association of the intent 'noise' with the IoT devices may also be suspended, based on user actions and a change in the values of the resources of the IoT device. For example, based on monitoring of the resources of the IoT devices, if it is detected that, when a call is received, the user does not reduce the speed of the fan or increases the speed of the fan, while the mobile phone controls to automatically lower the volume of the TV and the level of the chimney, and to turn off the dryer, the intent 'noise' may be disassociated from the resource 'speed' of the IoT device 'fan'. The context of when the call is received may similarly be updated to exclude an operation pertaining to reducing the speed of the fan.

In another example, consider that an IoT ecosystem comprises three IoT devices, e.g., a TV, a hue bulb, and a window blind. Each IoT device may comprise a plurality of resources, with each resource of each IoT device associated with an intent 'ambient light'. As the IoT devices may contribute to variations in the ambient light, the association of the intent ambient light' and the resources of the TV (mode), the hue bulb (brightness), and the window blind (position), may be predetermined. The value of the mode may be a normal mode, a sports mode, a theater mode, and so on. The value of the position may be open or close.

Consider that the TV is on, the brightness of the hue bulb is moderate and the window blind is open. When the user changes the mode of the TV to sports or theater, the embodiments include identifying the intent associated with the resource mode. The intent is identified on detecting (e.g., by monitoring) the change in the value of the resource 'mode'. Once the intent is identified as 'ambient light', the embodiments include identifying the IoT devices associated with the intent 'ambient light'. The embodiments include adjusting the brightness of the hue bulb and the position of the window blind based on a context. The context may be reducing brightness of the hue bulb and closing the window blind such that the user may have an enhanced user experience whiling viewing the TV in the sports mode or the theater mode.

In some embodiments, new IoT devices may be associated with the intent 'ambient light' based on changes in values of the resources of the new IoT devices when the user changes the mode of the TV, brightness of the hue bulb and the position of the window blind. The changes in the values of the resources of the new IoT devices may be triggered by the user or occurrences of events leading to changes in the ambient light.

Figure 11:
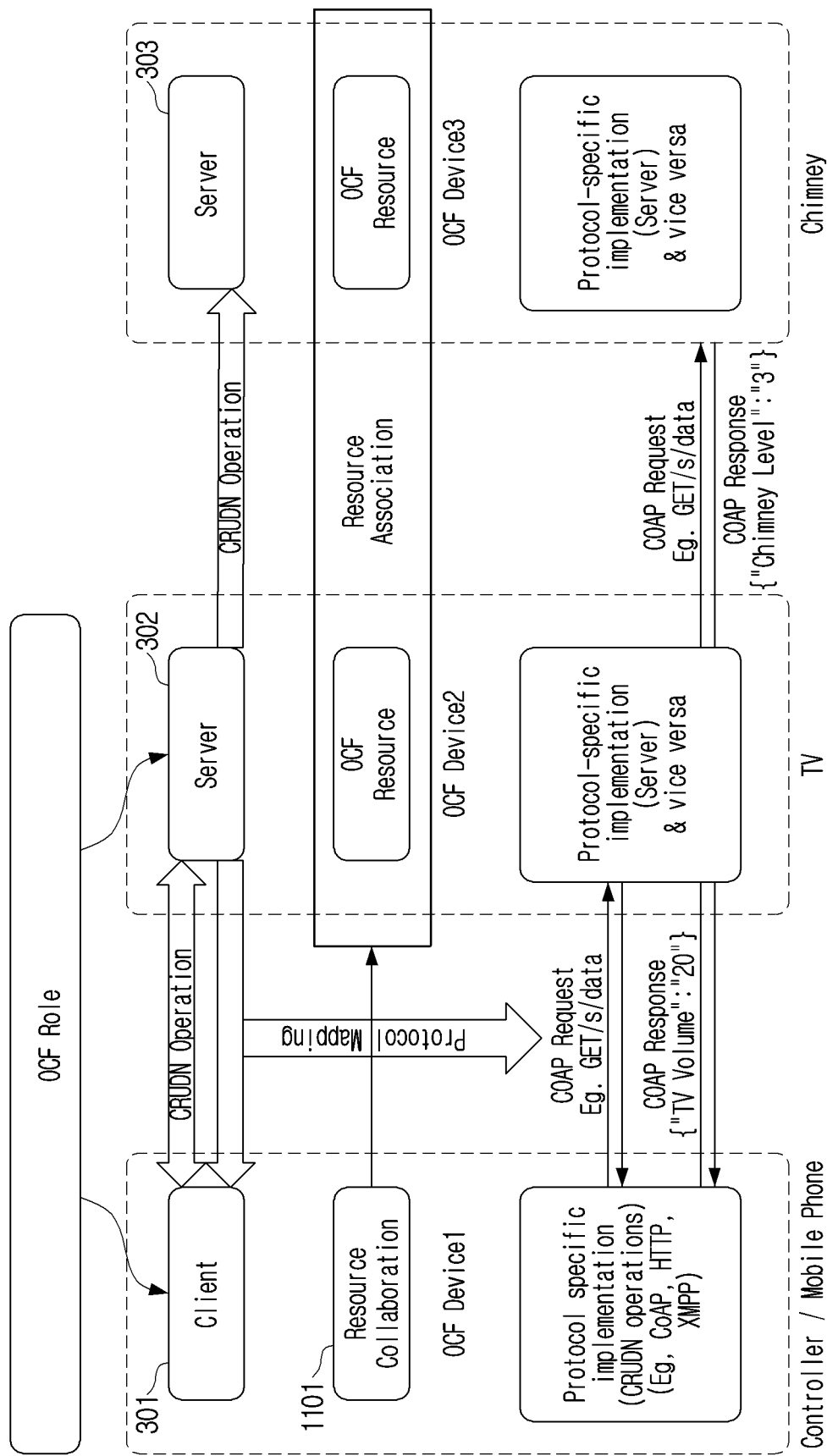
FIG. 11 illustrating an updated OCF architecture, wherein resource collaboration between the IoT devices is achieved, according to embodiments.

FIG. 11 illustrates an updated Open Connectivity Foundation (OCF) architecture, wherein resource collaboration between the IoT devices 301-303 is achieved, according to embodiments. The OCF architecture comprises a client 301 (labelled as OCF device 1), acting as a controller, and two servers 302 and 303 (labelled as OCF device 2 and OCF device 3). The client 301 may be a mobile phone and the servers 302 and 303 may be a television (TV) and a chimney, respectively. The client 301 and the servers 302 and 303 may be considered as IoT devices.

As depicted in FIG. 11, the resources of the IoT devices 301-303 may be logically associated and collaborate with each other through the controller IoT device 301. The resource collaboration between the IoT devices 301-303 may be achieved without introducing any changes in the OCF architecture. A resource collaboration block 1101 may perform functionalities of the processor 304a in the controller IoT device 301. The resource collaboration block 1101 may associate intents with the resources of the IoT devices 301-303.

The resource collaboration block 1101 may monitor the resources of the IoT devices 301-303 and detect changes or variations in the values of the resources of the IoT devices 301-303. The resource collaboration block 1101 may identify intents associated with the resources, whose values have undergone changes, and control the resources of IoT devices 301-303 that are associated with the same identified intents based on contexts. The resource collaboration block 1101 may update any existing intent-resource associations of the IoT devices 301-303 based on the changes in the values of the resources, caused by user actions, events, and the controller IoT device 301. The changes may have impact on the environment of the IoT ecosystem 300. Based on the impact and the predefined intents-resource associations, new intents may be derived, and existing intents-resource associations may be updated.

In an example, consider that the controller IoT device 301 is a mobile phone. The user, through the mobile phone, may control the resources of devices such as volume of a television, level of a chimney, and so on, if the resources of the devices are associated with the same intent. The resources, e.g., a volume and a level may be associated with an intent noise. The mobile phone may control the volume of the television and the level of the chimney simultaneously or sequentially. In this manner, embodiments of the disclosure obviates the need for the user to manually control each of the IoT devices and thus minimizes user effort.

Figure 12:
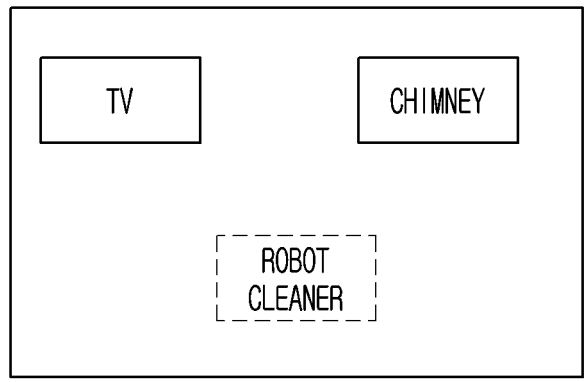
FIG. 12 is an example depicting the association of an IoT device robot cleaner with an intent noise, according to embodiments as disclosed herein.

FIG. 12 is an example depicting the association of an IoT device robot cleaner with an intent noise, according to embodiments as disclosed herein. As depicted in FIG. 12, resources of two IoT devices, viz., volume of a TV and fan speed of a chimney are associated with the intent noise. Consider that both the TV and the chimney are on. Consider that the embodiments have detected that the user reduces the volume (resource) of the TV (IoT device) and the fan speed (resource) of the chimney (IoT device) when a call is received (event in an IoT device smart phone). The embodiments include identifying that the intent associated with the resources (volume of the TV and the fan speed of the chimney) is noise.

Thereafter, the embodiments include determining other IoT devices whose resources are associated with the intent noise. The embodiments include determining other devices that may cause noise in the IoT ecosystem. Consider that the embodiments have determined that a robot cleaner is contributing to noise in the IoT ecosystem. The embodiments include associating the IoT device robot cleaner to noise. Thus, the resources, viz., volume of the TV, fan speed of the chimney, and the volume of the robot cleaner are grouped in the category of the intent noise.

Thereafter, when the user receives a call on the smart phone or any other device capable of receiving calls, the resources b volume of the TV, fan speed of the chimney, and the volume of the robot cleaner are controlled (reduced) either automatically or by the user through a displayed visual interface.

Figure 13:
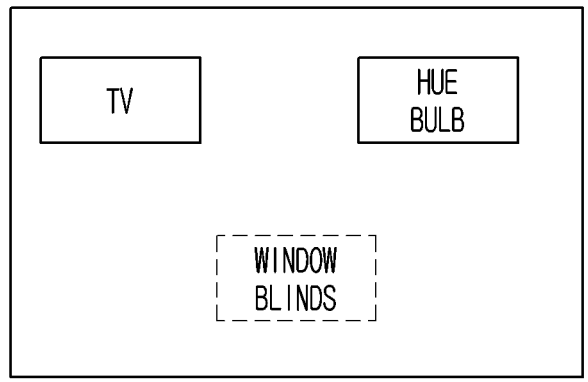
FIG. 13 is an example depicting the association of an IoT device window blind with an intent ambient light, according to embodiments as disclosed herein.

FIG. 13 is an example depicting the association of an IoT device window blind with an intent ambient light, according to embodiments as disclosed herein. As depicted in FIG. 13, resources of two IoT devices, viz., a mode of a TV and a brightness of a hue bulb, are associated with the intent ambient light. Consider that both the TV and the hue bulb are on. Consider that the embodiments have detected that whenever a user changes (event) the mode (resource) of the TV (IoT device) to sports or theater (value), the user also adjusts (event) the brightness (resource) of the hue bulb (IoT device). The embodiments include identifying that the intent associated with the resources (mode of the TV and the brightness of the hue bulb) is ambient light.

Thereafter, the embodiments include determining other IoT devices whose resources are associated with the intent ambient light. The embodiments include determining that when the mode of the TV is changed from sports to theater or theater to sports, and the brightness of the hue bulb is increased/decreased, the position of the window blind is changed from off to on, or from on to off.

As the mode of the TV and the brightness of the hue bulb are associated with the intent ambient light, the embodiments include associating the resource position of the IoT device window blind to the ambient light. Thus, the resources, viz., mode of the TV, brightness of the hue bulb, and position of the window blind are grouped in the category of the intent ambient light.

Thereafter, when the user changes the mode of the TV to sports/theater mode, the resources brightness (of the hue bulb) and position (of the window blind) are controlled either automatically or by the user through a displayed visual interface.

Figure 14A:
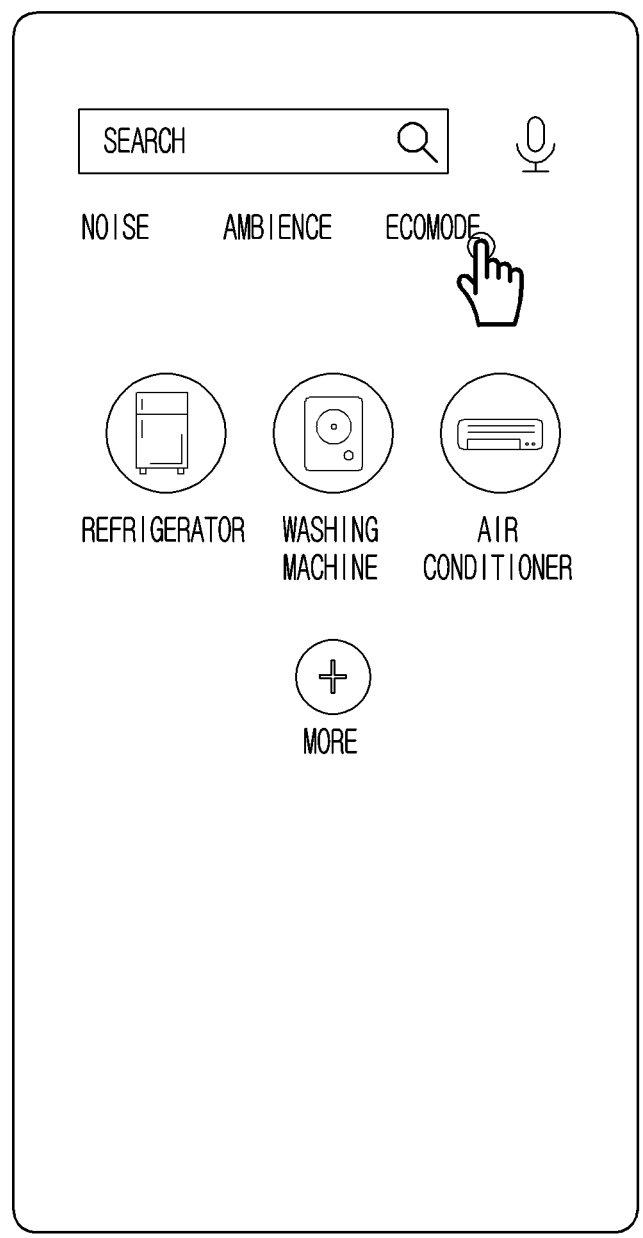
FIGS. 14A and 14B are examples of User Interfaces (UIs) for displaying IoT devices that are associated with a particular intent, and options, available to the user, to associate additional IoT devices with a particular intent, according to embodiments as disclosed herein.
Figure 14B:

FIGS. 14A and 14B are examples of User Interfaces (UIs) for displaying IoT devices that are associated with a particular intent, and options, available to the user, to associate additional IoT devices with a particular intent, according to embodiments as disclosed herein. As depicted in FIG. 14A, the intents noise, ambience, and eco-mode are displayed. When a user selects a particular intent, the IoT devices whose resources are associated with the selected intent are displayed to the user. As the user has selected the intent eco-mode, the IoT devices associated with eco-mode, viz., refrigerator, washing machine, and air conditioner are displayed.

As depicted in FIG. 14B, consider that the user has selected the intent noise. The IoT devices associated with noise, viz., television, chimney, and air conditioner are displayed. Further, additional IoT devices are suggested to the user, wherein the user may associate the resources of the suggested IoT devices to the intent noise. In an embodiment, the user selection of the additional IoT devices may be crowd-sourced for providing upgrades to the other users' IoT devices.

Figure 15A:
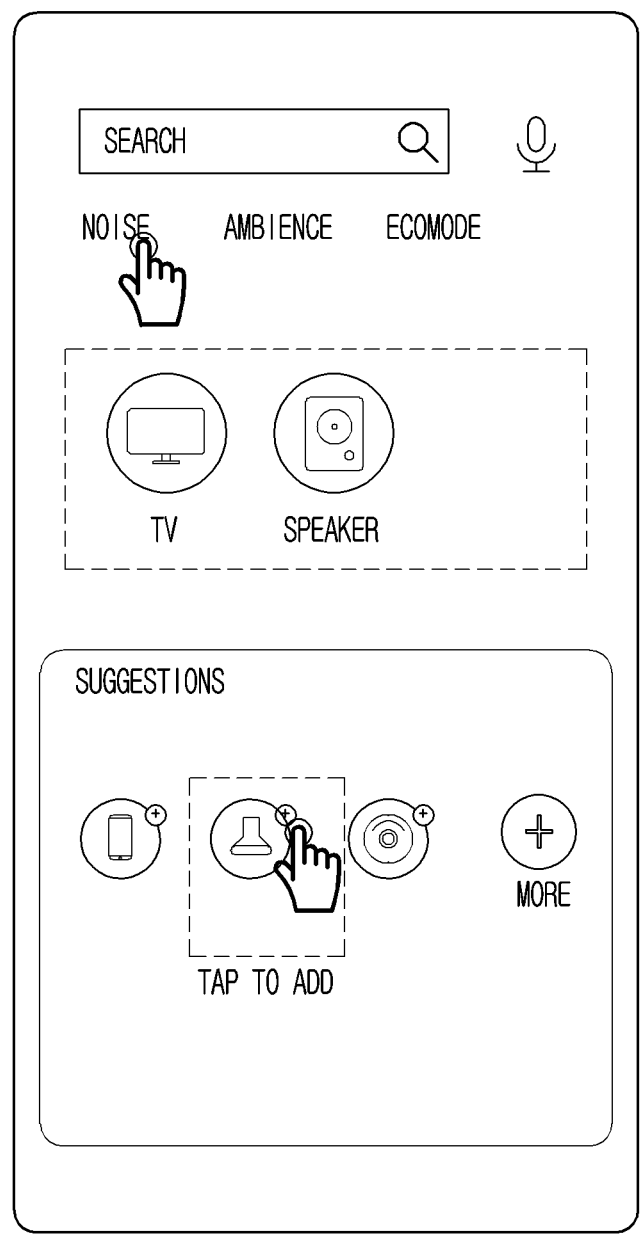
FIGS. 15A and 15B are examples of UIs that enable the users to associate an additional IoT device with a particular intent based on correlation between the IoT device and the intent, according to embodiments as disclosed herein.
Figure 15B:
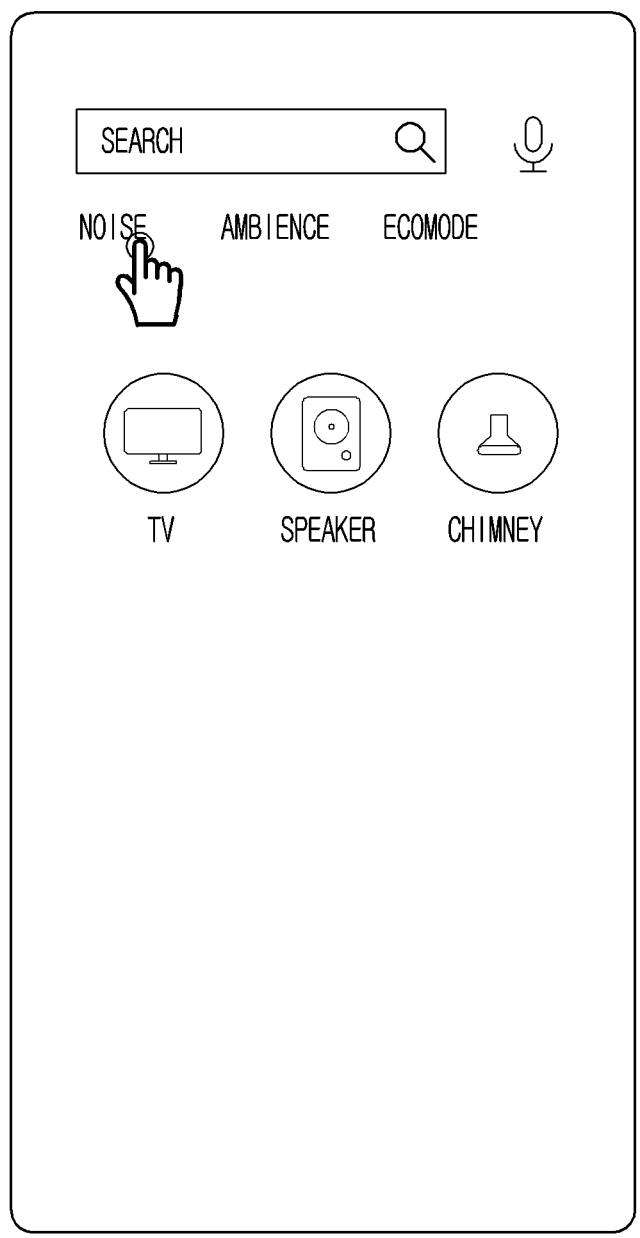

FIGS. 15A and 15B are examples of UIs that enable the users to associate an additional IoT device with a particular intent based on correlation between the IoT device and the intent, according to embodiments as disclosed herein. As depicted in FIG. 15A, when the user selects the intent noise, the IoT devices, viz., a TV and a speaker, whose resources are associated with the intent noise are displayed to the user. The correlation between the intent noise with the resources of the IoT devices, i.e., TV and the speaker, are high (close to 100). As the user has selected the intent noise, additional IoT devices are suggested to the user, wherein the user associates an IoT device, amongst the suggested IoT devices, to the intent noise. The additional IoT devices are suggested to the user, when the correlation between the intent noise and the resources of the additional IoT devices increases. Consider that the user selects an additional IoT device chimney. The user selection of an additional IoT device is considered as feedback. The user feedback may increase the degree of correlation between the intent noise and at least one resource of the IoT device chimney.

As depicted in FIG. 15B, when the user selects the intent noise in the future, the IoT devices, viz., the TV, the speaker, and the chimney, whose resources are associated with the intent noise, are displayed to the user. If the values of correlation varies, i.e., increases or decreases, due to user actions, events in the IoT devices associated with the intent noise, and variations in the environment of the IoT ecosystem; then additional IoT devices may be associated with the intent noise, and the IoT devices such as TV, speaker, and chimney, may be disassociated from the intent noise (if the correlation decreases).

The embodiments add functionalities in the OCF framework, e.g., collaboration between resources of IoT devices in the IoT ecosystem, and learn the pattern of a change in the values of resources of the IoT devices in order to associate the intents with the resources and update intent-resource association.

For a resource of an IoT device, the embodiments achieve collaboration, synchronization, categorization, interaction, and continuation, with other resources of the IoT device and the resources of the other IoT devices based on the derived intent associated with the resource of the IoT device and the resources of the other IoT devices.

The embodiments disclosed herein may be implemented through at least one software program running on at least one hardware device and performing network management functions to control the network elements. The network elements shown in FIG. 3 include blocks which may be at least one of a hardware device, or a combination of hardware device and software module.

The IoT ecosystem and the control method thereof according to the disclosure have an effect of, by making resources of IoT devices automatically collaborate based on intents, identifying an intent matched with a situation in which a user is placed, and automatically adjusting a plurality of resources of IoT devices effectively according to the identified intent.

Also, the IoT ecosystem and the control method thereof according to the disclosure may newly update association between an intent and a resource or a context, etc. based on a usage pattern of a user or a change of the environment in the IoT ecosystem, and thus have an effect of controlling the resources of IoT devices effectively according to a user's preference or living/working environment that change from moment to moment.

The aforementioned various embodiments of the disclosure may be implemented in a recording medium that may be read by a computer or an apparatus similar to a computer by using software, hardware or a combination thereof.

According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions.

In some cases, the embodiments described in this specification may be implemented as the processor 130 itself. Meanwhile, according to implementation by software, the embodiments such as procedures and functions described in this specification may be implemented as separate software modules. Each of the aforementioned software modules may perform one or more functions and operations described in this specification.

Computer instructions for performing processing operations at the electronic device 100 according to the aforementioned various embodiments of the disclosure may be stored in a non-transitory computer-readable medium. Computer instructions stored in such a non-transitory computer-readable medium make the processing operations at the electronic device 100 according to the aforementioned various embodiments performed by the aforementioned specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer-readable medium such as a CD, a DVD, a hard disc, a blue-ray disc, a USB, a memory card, a ROM and the like.

While example embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A method of controlling a plurality of Internet of Things (IOT) devices included in an IoT ecosystem, the method comprising:
   storing a first group including IoT devices among the plurality of IoT devices, wherein each of resources of the IoT devices in the first group is associated with a first intent related to a noise from among a plurality of intents, and wherein a size of sound related to the noise is changed based on the each of the resources;
   acquiring sensing data related to the first intent, wherein the sensing data includes a sound;
   identifying whether a size of the sound included in the sensing data is changed to be greater than or equal to a threshold according to a change in a mode of a second IoT device not included in the first group among the plurality of IoT devices;
   based on the sensing data being changed according to the change in the mode of the second IoT device, identifying the mode of the second IoT device as a resource associated with the first intent;
   updating the first group to include the second IoT device; and
   in response to an event corresponding to the first intent being identified, controlling a value of a resource of an IoT device among the IoT devices included in the updated first group and the mode of the second IoT device included in the updated first group such that a size of sound related to a noise from the IoT ecosystem is decreased.

2. The method of claim 1, wherein the first intent indicates an aspect of an influence made to the IoT ecosystem according to at least one of IoT devices included in the IoT ecosystem.

3. The method of claim 1, further comprising:
   acquiring the sensing data related to the first intent;
   identifying a third IoT device from among the first group based on the sensing data not being changed according to a change of a value of a resource of the third IoT device; and
   updating the first group to exclude the third IoT device.

4. The method of claim 1, further comprising:
   storing a plurality of groups associated with each of the plurality of intents from among the plurality of IOT devices for each intent of the plurality of intents, and
   identifying a change of sensing data related to each of the plurality of intents.

5. The method of claim 1, wherein the second IoT device is a robot cleaner,
   wherein the sensing data includes a sound from the IoT ecosystem, and
   wherein the event includes an event that a user performs a call.

6. An Internet of Things (IoT) device for controlling a plurality of IoT devices, the IoT device and the plurality of IoT devices being included in an IoT ecosystem, the IoT device comprising:
   a communication interface configured to connect with the plurality of IoT devices, and
   a processor configured to:
   store a first group including IoT devices among the plurality of IoT devices, wherein each of resources of the IoT devices in the first group is associated with a first intent related to a noise from among a plurality of intents, and wherein a size of sound related to the noise is changed based on the each of the resources,
   acquire sensing data related to the first intent, wherein the sensing data includes a sound,
   identify whether a size of the sound included in the sensing data is changed to be greater than or equal to a threshold according to a change in a mode of a second IoT device not included in the first group among the plurality of IoT devices,
   based on the sensing data being changed according to the change in the mode of the second IoT device, identify the mode of the second IoT device as a resource associated with the first intent,
   update the first group to include the second IoT device, and
   in response to an event corresponding to the first intent being identified, control a value of a resource of an IoT device among the IoT devices included in the updated first group and the mode of the second IoT device included in the updated first group such that a size of sound related to a noise from the IoT ecosystem is decreased.

7. The IoT device of claim 6, wherein the first intent indicates an aspect of an influence made to the IoT ecosystem according to at least one of IoT devices included in the IoT ecosystem.

8. The IoT device of claim 6, wherein the processor is further configured to:
   acquire the sensing data related to the first intent,
   identify a third IoT device from among the first group based on the sensing data not being changed according to a change of a value of a resource of the third IoT device, and
   update the first group to exclude the third IoT device.

9. The IoT device of claim 6, wherein the processor is further configured to:
   store a plurality of groups associated with each of the plurality of intents from among the plurality of IoT devices for each intent of the plurality of intents, and
   identify a change of sensing data related to each of the plurality of intents.

10. The IoT device of claim 6, wherein the second IoT device is a robot cleaner, wherein the sensing data includes a sound from the IoT ecosystem, and wherein the event includes an event that a user performs a call.

* * * * *